United States Patent [19]
Ekrot et al.

[11] Patent Number: 5,812,751
[45] Date of Patent: Sep. 22, 1998

[54] MULTI-SERVER FAULT TOLERANCE USING IN-BAND SIGNALLING

[75] Inventors: Alexander C. Ekrot, Humble; James H. Singer, Houston; John M. Hemphill, Spring; Jeffrey S. Autor; William C. Galloway, both of Houston; Dennis J. Alexander, Spring, all of Tex.

[73] Assignee: Compaq Computer Corporation, Houston, Tex.

[21] Appl. No.: 943,655

[22] Filed: Oct. 3, 1997

Related U.S. Application Data

[63] Continuation of Ser. No. 445,283, May 19, 1995, Pat. No. 5,675,723.

[51] Int. Cl.[6] ............................................. G06F 11/34
[52] U.S. Cl. ............................ 395/182.02; 395/182.11
[58] Field of Search .......................... 395/180, 181, 395/182.11, 182.13, 182.14, 182.08, 182.09, 182.1, 182.15, 182.01, 182.02; 364/228.3, 229, 229.4

[56] References Cited

U.S. PATENT DOCUMENTS

| | | |
|---|---|---|
| 4,347,563 | 8/1982 | Paredes et al. . |
| 4,408,649 | 10/1983 | Beshears et al. . |
| 4,710,926 | 12/1987 | Brown et al. . |
| 4,819,159 | 4/1989 | Shipley et al. . |
| 5,155,729 | 10/1992 | Rysko et al. . |
| 5,157,663 | 10/1992 | Major et al. . |
| 5,185,693 | 2/1993 | Loftis et al. . |
| 5,255,367 | 10/1993 | Bruckert et al. . |
| 5,271,013 | 12/1993 | Gleeson . |
| 5,390,326 | 2/1995 | Shah . |
| 5,394,526 | 2/1995 | Crouse et al. . |
| 5,446,736 | 8/1995 | Gleeson et al. ................. 370/85.13 |
| 5,450,578 | 9/1995 | Mackenthun ................... 395/182.02 |
| 5,452,448 | 9/1995 | Sakuraba et al. . |
| 5,471,634 | 11/1995 | Giorgio et al. . |
| 5,488,716 | 1/1996 | Schneider et al. ............. 395/182.08 |

*Primary Examiner*—Albert De Cady
*Attorney, Agent, or Firm*—Sharp, Comfort & Merrett, P.C.

[57] ABSTRACT

A primary server/standby server network configuration according to the invention includes a primary server executing network operating system software and a standby server monitoring for the proper operation of the primary server, where both the primary server and the standby server are connected to a storage system. If the primary server fails, the standby server instructs the storage system to switch its hardware connections to the standby server, allowing the standby server to boot the operating system. This instruction is done via in-band signaling. Further, multiple primary servers can be backed up by a single standby server.

25 Claims, 16 Drawing Sheets

MULTI-SERVER FAULT TOLERANCE USING IN-BAND SIGNALLING

This is a continuation, of application Ser. No. 08/445,283, filed May 19, 1995, now U.S. Pat. No. 5,675,733.

BACKGROUND OF THE INVENTION

1. Field of the Invention

The invention relates to fault tolerant servers, and more specifically to a storage system that switches from a primary server to a standby server based on in-band signals sent over a SCSI bus.

2. Description of the Related Art

From their humble beginnings as personal, desktop computers, microprocessor-based computing systems have made great strides in providing for the ever expanding computing needs of data processing systems. Networks of microprocessor-based computers have made tremendous inroads into what was once the exclusive domain of large mainframe computers. Powerful microprocessor-based computers act as servers on networks of sometimes over 100 personal computers. These networks have provided powerful distributed computing capability in conjunction with centralized access to data, along with direct communications between the personal computers on the network.

The expansion of the microprocessor-based computing system into the mainframe domain, however, has not been problem free. Mainframe systems have historically been designed to be reliable and extremely "fault tolerant," in that a failure of a portion of the mainframe system does not result in corrupted data or extensive downtime. Fault tolerance has long been the mainstay of the mainframe world, but with the inroads of microprocessor-based networks into that realm, network users are increasingly demanding that their networks provide fault tolerance even to the extent historically found in mainframe computers.

To this end, developers have introduced a number of schemes for providing fault tolerance in microcomputer networks. Typically, a network includes network hardware, work stations and one or more servers, each with its own mass storage subsystem. The servers are a cornerstone of the entire system, providing data and communications among the various work stations. If one of these servers should fail, or its mass storage subsystem become corrupted, this can bring the entire network to a halt.

To improve the fault tolerance of such servers, vendors have supplied a number of fault tolerant systems. One such standard is "SFT III," or system fault tolerance level 3, a server operating system standard endorsed by Novell, Incorporated. In this network operating system ("NOS"), each "virtual" server is actually two servers running in tandem, continuously mirroring each other's data and processor operation. If one of these physical servers should fail, the other keeps running. This system is expensive, however, requiring identical hardware and a high speed fiber optic link between the physical servers.

The SFT III solution is often both overly expensive and excessive protection given mid-level users' needs. Such users often do not require the instantaneous recovery from a server crash provided by SFT III. To this end, a number of vendors have developed systems in which if the primary server fails, a standby server takes over the primary server's operation after a short, but not instantaneous, period of time. The standby server can use less expensive, albeit slightly slower, hardware than the primary server, reducing overall system cost. Such a system has been introduced by NetGuard Systems, Incorporated.

A problem with this these systems is their reliance on "out of band" signalling. In the NetGuard system, the primary server is monitored by a backup server. Both the primary and the backup server are connected to the same mass storage subsystem. But each server is connected to that subsystem not only via a SCSI link to provide for data and control communications, but also by a serial link. The standby server uses the serial link to inform the storage system that it will be taking control over from the primary server. The storage system then switches from the primary server to the standby server. Thus, this "out of band" signalling requires additional cabling from the standby server to the storage system. It would be desirable to eliminate this extra cabling.

Further, it would be desirable to further reduce the cost of providing standby capability for multiple primary servers on a single network.

SUMMARY OF THE INVENTION

According to one aspect of the disclosed embodiment, a primary server and a standby server are both connected to a network. Both the primary server and standby server are connected to the same storage system, which includes switching capability to switch between the primary server and the standby server. During normal operation, the primary server sends heartbeat messages to the standby server indicating it is properly functioning. As long as the primary server sends these heartbeat messages, the standby server remains in a standby mode, monitoring the primary server but not performing network functions.

When the primary server fails, it quits sending heartbeat messages. The standby servers recognizes this lack of heartbeat messages, and causes the storage system to switch from the primary server to the standby server using in-band signalling over the storage system cabling, allowing the standby server to boot a network operating system located on the storage system. The standby server then assumes the functions previously performed by the primary server until the primary server is brought back on line.

According to another aspect of the disclosed embodiment, when the primary server is brought back on line, it sends a message to the standby server which is acting in a primary mode, causing the standby server to shut down. The primary server then sends a series of in-band signals to the storage system, causing the storage system to switch from the standby server to the primary server.

In another aspect of the disclosed embodiment, these in-band signals are a series of reset pulses sent over a SCSI communications bus.

In another aspect of the disclosed embodiment, a standby server acts as a back up to multiple primary servers. Each primary server sends heartbeat signals to the standby server, and when one of the primary servers fails, the standby server assumes control by causing the storage system to which itself and the failed primary server are connected to switch to the standby server. The standby server then boots the network operating system located on the storage system, assuming the role of the failed primary server.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
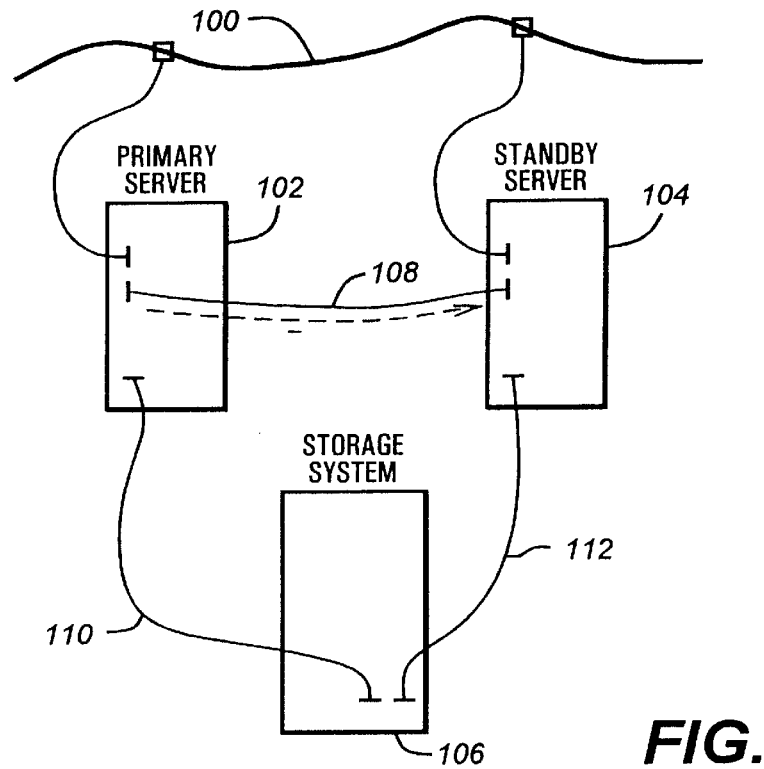
FIG. 1 is a block diagram of a primary server/standby server network configuration according to the invention.

Turning to FIG. 1, a network 100 is shown that is connected to a primary server 102, a standby server 104, and a storage system 106 implemented according to the invention. Both the primary server 102 and the standby server 104 are connected to the network 100 using standard network interfaces for any of a wide variety of networks, such as Ethernet. The primary server 102 and the standby server 104 are further connected to each other by a serial link 108. The serial link 108 is a standard serial link for a personal computer and would preferably be connected to COM ports on the primary server 102 and the standby server 104. Although the serial link 108 has been disclosed, a parallel link, fiber optic link, or any of a wide variety links could instead be used. Further, as discussed below in conjunction with FIG. 2, the serial link 108 could be eliminated entirely.

The primary server 102 is connected to the storage system 106 by a first SCSI cable 110. The primary server 102 contains a SCSI controller to access the storage system 106 through the first SCSI cable 110. The standby server 104 is similarly connected to the storage system 106 through a second SCSI cable 112.

Although the first SCSI cable 110 and the second SCSI cable 112 are disclosed in this embodiment, a bus other than an SCSI bus cable could be used in other embodiments. For example, a fiber optic link with appropriate controllers, or other type of link between the primary server 102 and standby server 104 to the storage system 106 could be implemented, as is well known to those skilled in the art of storage system design. Further, the storage system 106 in the disclosed embodiment is a preferably a disk array, but could be a variety of other types of storage systems, such as a WORM (Write Once Read Many) drive, an erasable CD ROM drive, or a variety of other types of storage systems.

The storage system 106 is shown coupled to both the primary server 102 and the standby server 104. Because only one of these two servers 102 or 104 will be acting as a server on the network 100 at any one time, the storage system 106 must switch between the two SCSI cables 110 and 112. The hardware and software for providing this is further described below in conjunction with the discussions of FIGS. 10–14b, but to summarize, the storage system 106 monitors the second SCSI cable 112 from the standby server 104 for a series of SCSI resets. When it receives these resets, it switches using hardware switches from the first SCSI cable 110 to the second SCSI cable 112. The standby server 104 then boots the NOS, which is located in the storage system 106.

During normal operation, the primary server 102 periodically sends a "heartbeat" message to the standby server 104 over the serial link 108. The standby server 104 monitors for this heartbeat. If the standby server 104 does not periodically receive that heartbeat, it knows that the primary server 102 has failed. It then passes the appropriate series of resets over the second SCSI cable 112 to the storage system 106, which then switches from the first SCSI cable 110 to the second SCSI cable 112. The standby server 104 then reboots the full NOS which is loaded onto the storage system 106 and performs any disk recovery necessary. The standby server 104 then acts in place of the primary server 102 on the network 100.

According to a further embodiment of the invention, once the failed primary server 102 is repaired and restarted, its Power On Self Test ("POST") code then passes a command over the serial link 108 to the standby server 104 that forces the standby server 104 to shut down. The primary server 102 then sends resets over the first SCSI cable 110 to the storage system 106, reboots the NOS from the storage system 106, and resumes acting in its role as a server for the network 100.

It will be appreciated that both the primary server 102 and the standby server 104 include power-on self test, or "POST," code in their system read only memory. This code is preferably identical, as will be discussed below in conjunction with the discussions of FIGS. 5A–5C. In the disclosed embodiment, the NOS is not on a local drive of the standby server 104 or the primary server 102, but is instead located on the storage system 106. Therefore, the standby server 104 and the primary server 102 will be executing the same code when they boot the NOS from the storage system 106.

Figure 2:
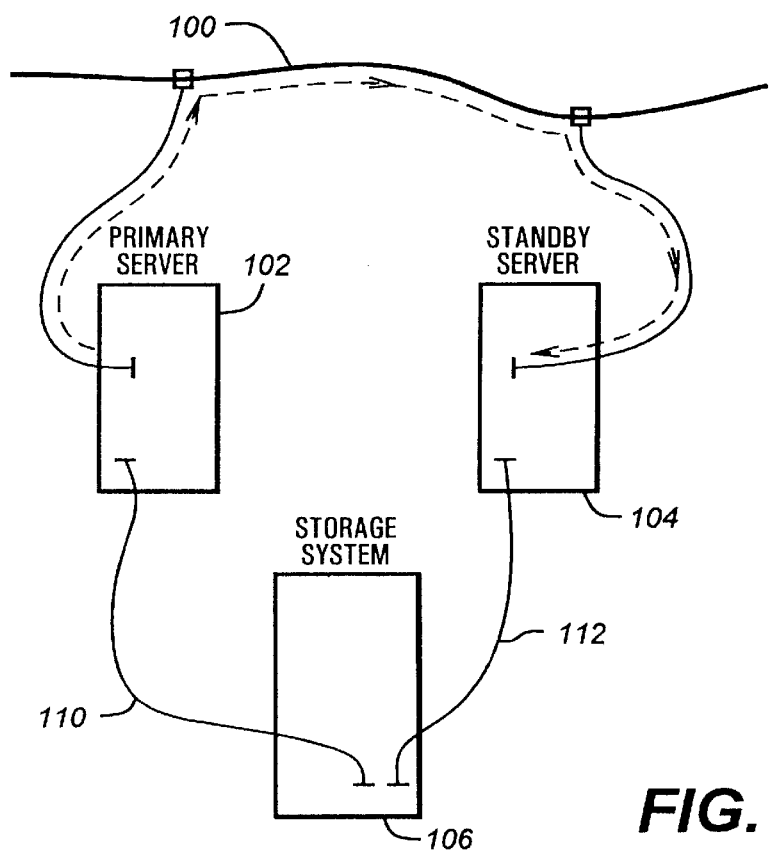
FIG. 2 is a block diagram of another embodiment of a primary server/standby server system according to the invention that eliminates a serial link between the primary server and the standby server.

Turning to FIG. 2, an alternative embodiment according to the invention is shown. This configuration of servers is the same as that illustrated in FIG. 1, except that the serial link 108 has been eliminated. Instead of sending a heartbeat over the serial link 108, the primary server 102 sends its heartbeat to the standby server 104 over the network 100 itself. The standby server 104 in this case must be running an operating system sufficient to monitor network packages passed over the network 100, but otherwise acts the same as the system described in FIG. 1.

Figure 3:
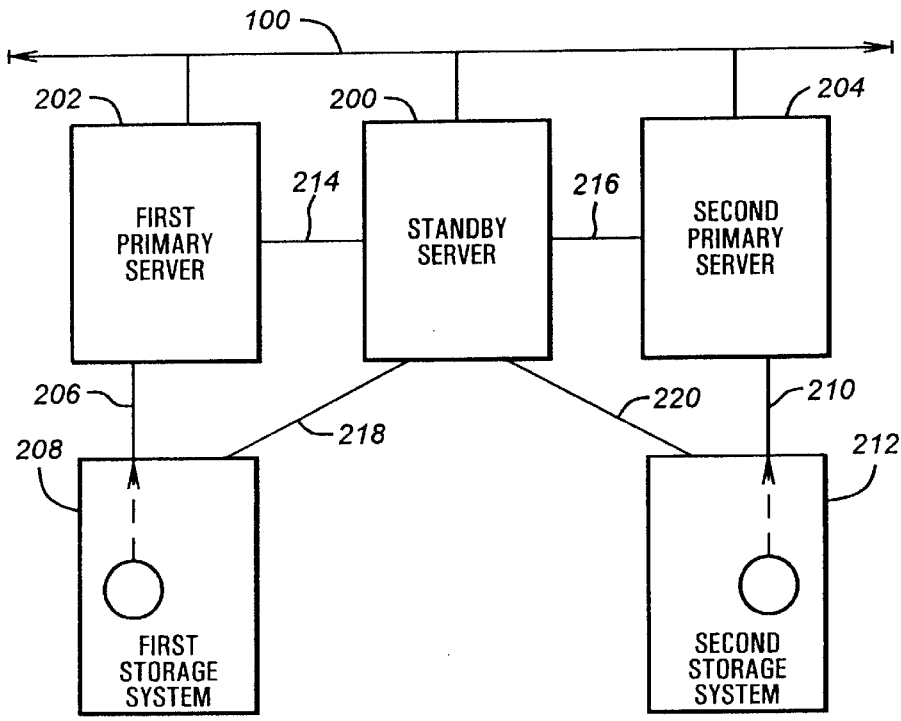
FIG. 3 is a block diagram of a standby server which acts as a back up to multiple primary servers on a network according to the invention.

Turning to FIG. 3, yet another embodiment according to the invention is shown. This embodiment involves a single standby server 200 acting as a backup to both a first primary server 202 and a second primary server 204. The first and second primary servers 202 and 204 are configured similarly to the primary server 102 of FIG. 1. The first primary server 202 is connected via a first SCSI cable 206 to a first storage system 208, while the second primary server 204 is connected via a second SCSI cable 210 to a second storage system 212. The first storage system 208 and the second storage system 212 are similar to the storage system 106 of FIGS. 1 and 2. As in FIGS. 1 and 2, the first primary server 202 is connected to the single standby server 200 via a serial link 214, and the second primary server 204 is connected via a serial link 216 to the single standby server 200. The single standby server 200 differs from the standby server 104 of FIGS. 1 and 2 in that it has two SCSI cables 218 and 220, the first of which connects to the first storage system 208 and the second of which connects to the second storage system 212. The single standby server 200 preferably has a separate SCSI controller for each of these SCSI cables 218 and 220, although a switched controller could also be used. As in the systems of FIGS. 1 and 2, the first primary server 202, the second primary server 204, and the single standby server 200 are all connected to the network 100. The system of FIG. 3 could further omit the serial links 214 and 216 as described in conjunction with FIG. 2, and instead communicate "heartbeats" over the network 100.

The system of FIG. 3 provides the single standby server 200 as a backup to both the first primary server 202 and the second primary server 204. In operation, the first primary server 202 and the second primary server 204 each provide heartbeats to the single standby server 200 over the serial links 214 and 216 (or over the network 100 in the alternatively described embodiment). The first storage system 208 is connected through internal switches to the first primary server 202 during normal operation, and the second storage system 212 is similarly connected to the second primary server 204 through switches during normal operation. Should the first primary server 202 or the second primary server 204 fail, the single standby server 200 will cease receiving heartbeats from that particular server. It will then provide the appropriate resets to be discussed below in conjunction with the discussions of FIGS. 10–14b to the corresponding first storage system 208 or second storage system 212, depending on whether the first or the second primary server 202 or 204 ceases sending a heartbeat. The single standby server 200 will then boot the NOS located on the first or second storage system 208 or 212, and then act as a network 100 server in place of either the first primary server 202 or the second primary server 204, whichever failed. In this way, the single standby server 200 acts as a hardware backup to a plurality of primary servers 202 and 204. As will be appreciated by one skilled in the art, the single standby server 200 could further be connected to a third, fourth, etc. primary server, with corresponding connections to those servers' corresponding storage systems.

Software Control of the Servers

Figure 4:
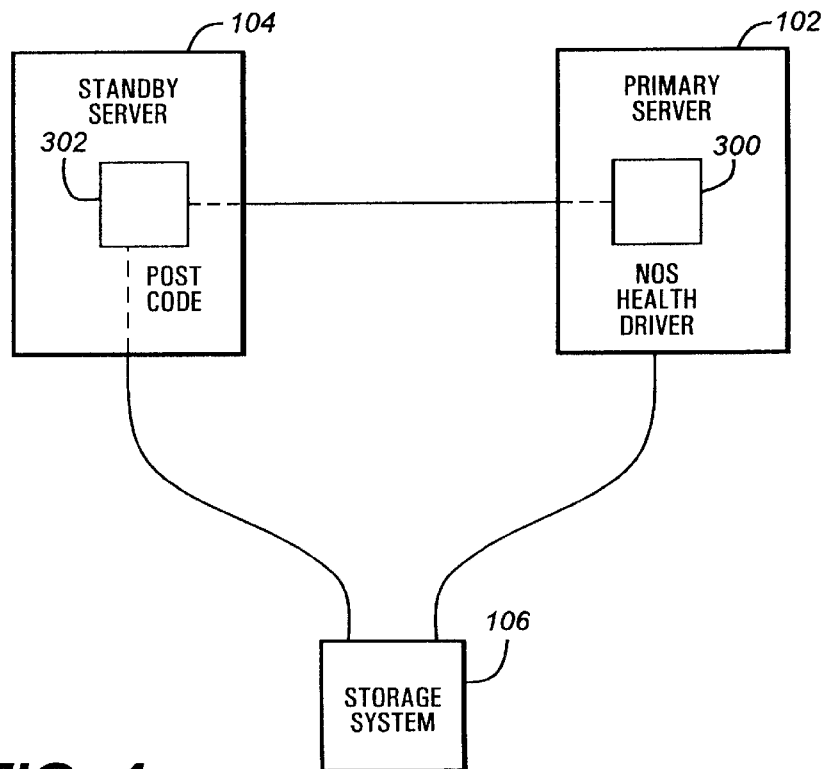
FIG. 4 is a block diagram of the software being executed in the embodiment illustrated in FIGS. 1–3.

Turning to FIG. 4, a block diagram of the software that controls the system of FIG. 1 is shown. This diagram will help in the understanding of the software described below in conjunction with the discussions of FIGS. 5A–8. The primary server 102 is preferably running a NOS such as Novell Netware or Windows NT by Microsoft Corporation, although a wide variety of NOSs could be used. One of the applications running in the primary server 102 is a NOS health driver 300. This is a routine that is periodically called by the system software in the NOS of the primary server 102. This software checks the "health" of the system, and logs errors and performs shutdowns when there are problems with the primary server 102. This software is further described in Assignee's U.S. Pat. No. 5,390,324, issued Feb. 14, 1995, and entitled "Computer Failure Recovery and Alert System," which is hereby incorporated by reference. The NOS health driver 300 software specific to the disclosed embodiment is further described below in conjunction with the discussions of FIGS. 6–9.

The standby server 104 includes Power On Self Test ("POST") code 302. This is further described below in conjunction with the discussions of FIGS. 5A–5C. It should be noted that code for the NOS health driver 300 is initially found in the storage system 106, while the POST code 302 is included in non-volatile memory of both the primary server 102 and the standby server 104. While the primary server 102 is operational, it is executing the NOS health driver code 300, and while the standby server 104 is acting in its corresponding standby role, the standby server 104 is executing the POST code 302. The POST code 302, generally contained in the system Read Only Memory (ROM), is executed until a failure of the primary server 102 is detected, as will be discussed below in conjunction with the discussions of FIGS. 5A–5C.

The Post Code

Figure 5A:
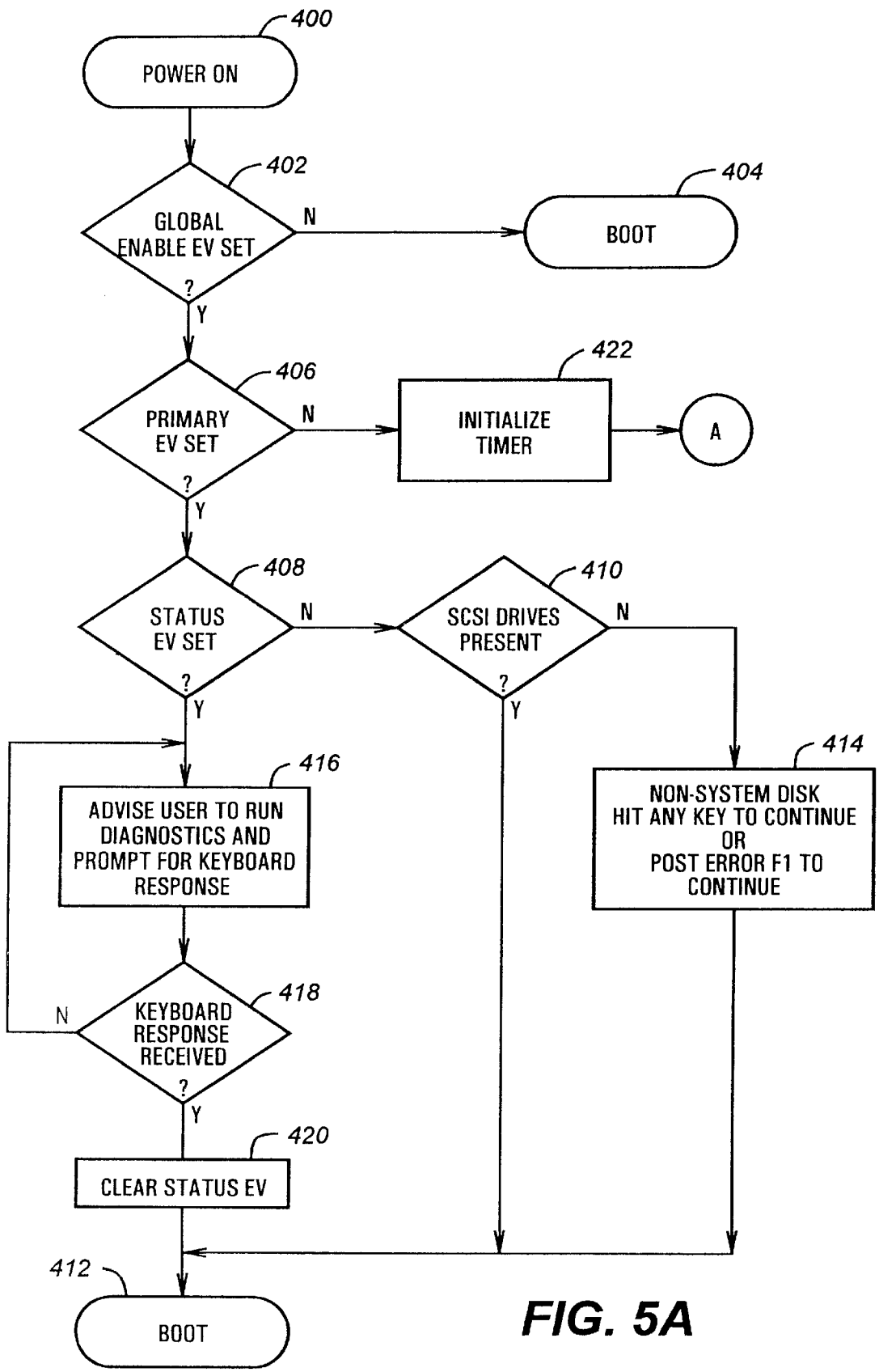
FIGS. 5A–5C are flowchart illustrations of power-on self-test ("POST") software code executed by the primary server/standby server configuration according to the invention.
Figure 5B:
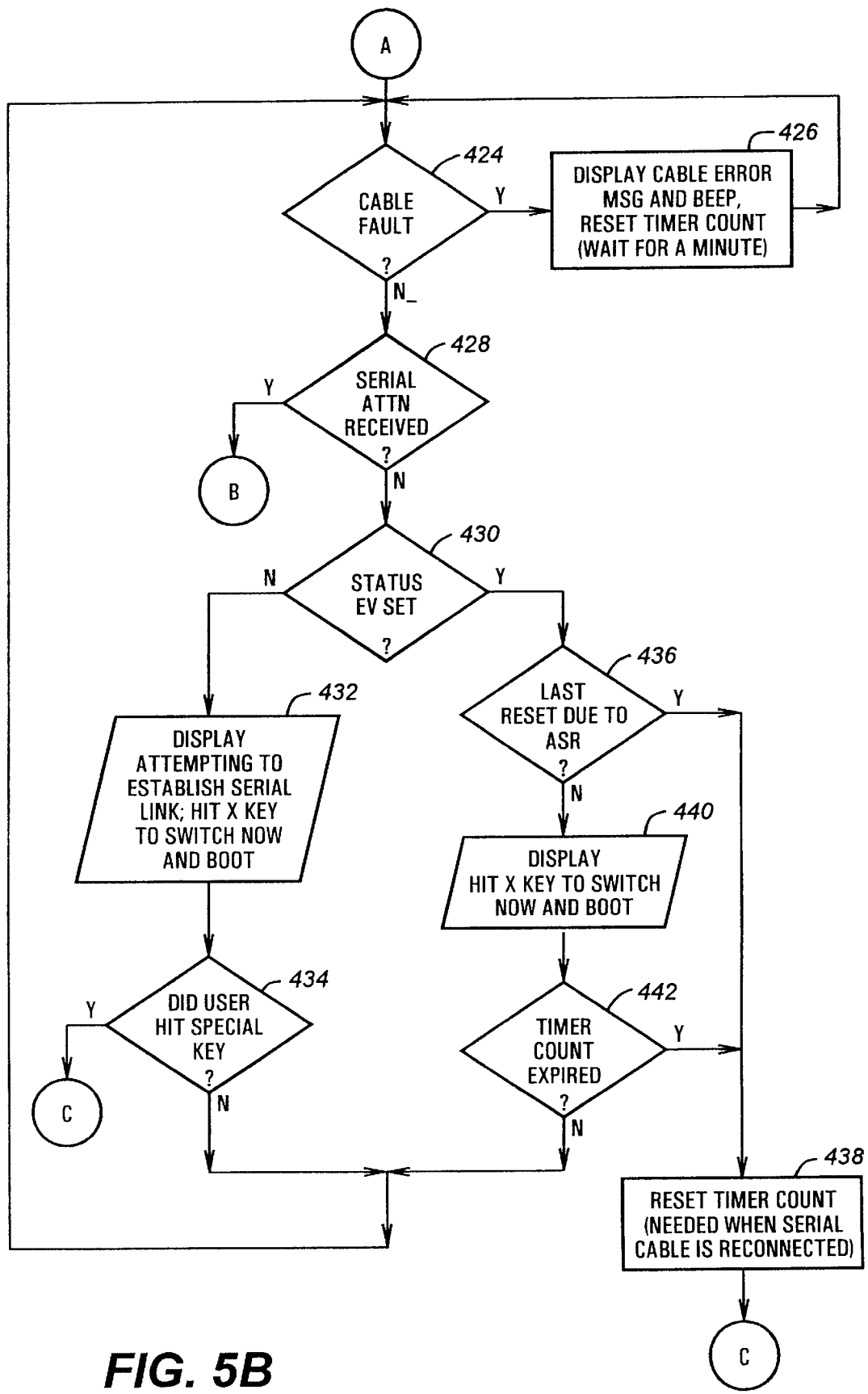
Figure 5C:
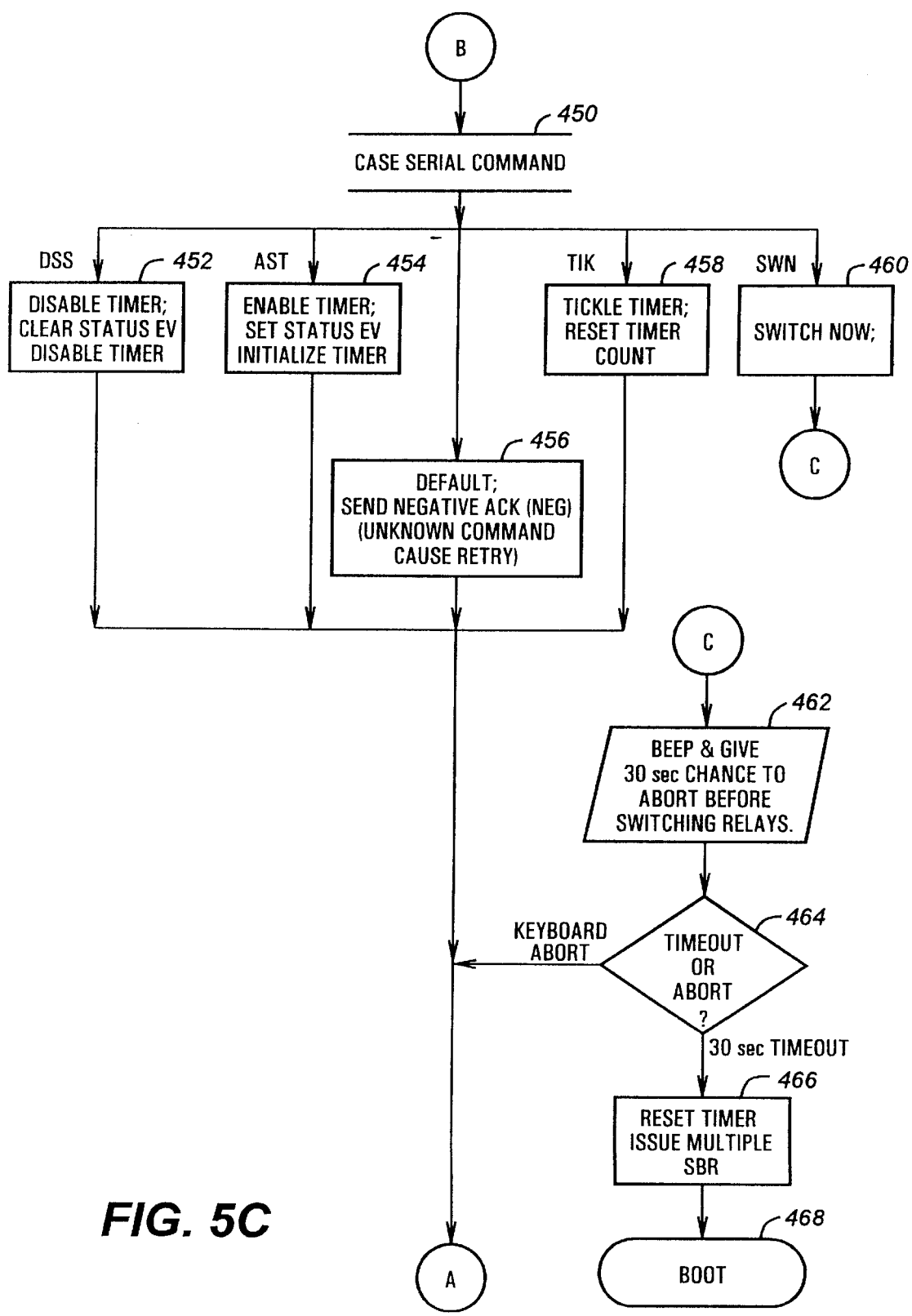

Turning to FIGS. 5A–5C, a flow chart illustrating the POST code 302 is shown. This ROM code is preferably held in a flash EEPROM ("Electrically Erasable Read Only Memory") in both the primary server 102 and the standby server 104. If a flash EEPROM is used, the code can be conveniently updated by the customer, rather than requiring the replacement of a standard ROM. Again, identical POST code is preferably executed by both the primary server 102 and the standby server 104.

Before discussing the code illustrated by FIGS. 5A–5C, it must be understood that there are certain "environmental variables," or EVs, that are used by this code. An EV is preferably held in non-volatile memory that is preserved even when the power is shut down on a system. This non-volatile memory is generally implemented as an NVRAM ("Non-Volatile Random Access Memory"). Certain of these EVs are initially set during system configuration, and four EVs are of primary interest.

The first is the global enable EV. The global enable EV determines whether the system as a whole is configured to run in a primary-standby mode. The global enable EV should be identically set in both the primary server 102 and the standby server 104.

The next EV is the primary EV. The primary EV, when set, indicates that the server on which the software is running is the primary server 102. Similarly, if not set, this indicates that the software is running on the standby server 104. In this way, the software illustrated in FIGS. 5A–5C, as well as FIGS. 6–8 discussed below, knows whether it is running on the primary server 102 or the standby server 104.

The next EV of interest is the status EV. The status EV in general indicates whether the standby server 104 is currently operating in its standby mode, monitoring the operation of the primary server 102. As discussed above, the primary server 102 periodically sends a heartbeat signal to the standby server 104. If the standby server 104 does not receive such a signal within a predetermined length of time, it assumes that the primary server 102 has failed. If the status EV is reset, the standby server 104 ignores a failure of the primary server 102 to send a heartbeat signal. This could occur, for example, when the primary server 102 is performing system maintenance in which it cannot send the periodic heartbeat signal.

The status EV has a slightly different meaning in the primary server 102 as compared to the standby server 104. On the primary server 102, the status EV is set during system operation when the primary server 102 is sending heartbeat signals. The status EV has a further meaning to the primary server 102 on initialization, however. On a graceful power down, such as a user-initiated shutdown, the primary server 102 resets the status EV. When the primary server 102 is rebooted, it examines the status EV. If the status EV is not reset, this indicates a non-graceful, or catastrophic, failure occurred, causing the previous restart of the primary server 102. In such a case, appropriate action must be taken to ensure the primary server 102 is working correctly.

On the standby server 104, the status EV is set when the standby server 104 is monitoring the primary server 102. The primary server 102 can cause the standby server 104 to reset its status EV by a command to the standby server 104. On system restart, if the status EV is set on the standby server 104, this indicates that when the standby server 104 was previously shut down, it had taken over command from the primary server 102. Unless the primary server 102 reinstitutes sending heartbeat messages, the standby server 104 will once again take over processing from the primary server 102. Otherwise, the standby server 104 was not previously monitoring for heartbeats from the primary server 102, so it will instead simply try to reestablish serial communications with the primary server 102.

The final EV of interest is the ASR EV, or the automatic server recovery EV. Automatic server recovery is a recovery system for use in servers that is further described in U.S. Pat. No. 5,390,324, previously incorporated by reference. ASR employs a deadman timer. When a server NOS fails to reset that deadman timer within a predetermined period of time, the ASR timer times out, causing a system shutdown as well as the recordation of certain errors in a critical error log. This is further described in the incorporated patent application. The ASR EV indicates whether the last shutdown was due to an ASR time out, indicating catastrophic failure of some sort. Of note, the ASR EV remains set if a system failure causes an ASR shutdown. The POST code can use the state of the ASR EV to determine if the standby server 104 experienced a non-graceful shutdown, usually caused by an ASR restart, or by a temporary power failure followed by a restart.

Of note, the ASR EV is only set by a NOS; the POST code does not modify the ASR EV. Thus, if the ASR EV is set on the standby server 104, this indicates the standby server 104 was previously running the NOS and had experienced a non-graceful, ASR shutdown followed by a reboot. This would be true if the standby server 104 had taken over control from the primary server 102 when the standby server 104 was last running.

With this in mind, we turn to the flow charts of FIGS. 5A–5C. In FIG. 5A, the POST code 302 begins at step 400 when the power is turned on. Proceeding to step 402, the POST code 302 determines whether the global enable EV is set. If not, this indicates that standby server monitoring is currently not being used, so the routine proceeds to step 404, where the system executes other, unrelated POST code and boots normally.

If at step 402 the global enable EV is set, control proceeds to step 406, where the POST code 302 determines whether the primary EV is set. If so, this indicates that the POST code 302 of FIGS. 5A–5C is running on the primary server 102. Control then proceeds to step 408, where the POST code 302 determines whether the status EV is set. If not, this indicates the last shutdown of the primary server 102 was graceful, so there is no need to alert the user of a previous failure. Therefore, control proceeds to step 410 where the POST code 302 determines whether SCSI drives are connected. If so, control then proceeds to step 412, where the primary server 102 normally boots the NOS. If at step 412 SCSI drives were determined to be absent, control proceeds to step 414, where the primary server 102 indicates a non-system disk or a POST error, so the user must hit a key before continuing. The user may, for example, have neglected to turn on the storage system 106.

If at step 408 it was determined that the status EV was set, this indicates the previous primary server 102 shutdown was non-graceful. Control then proceeds to step 416, where the user is advised to run diagnostics and also requested to hit a keyboard character to continue. Proceeding to step 418, if the user did not hit a keyboard response, control loops back to step 416. Otherwise from step 418 control proceeds to step 420, where the status EV is cleared, and then to step 412 where the primary server 102 boots. The status EV will subsequently be set by the software illustrated in FIG. 6, discussed below.

If at step 406 it was determined that the primary EV was not set, control proceeds to step 422. This would occur when this POST code 302 is running on the standby server 104. At step 422, a timer for the standby server 104 is initialized. This timer is a countdown timer that unless periodically reset in response to a heartbeat from the primary server 102 will cause the standby server 104 to instruct the storage system 106 to switch SCSI ports, to boot the NOS from the storage system 106, and to assume the server operations of the primary server 102. To initialize the timer, the timer is simply loaded with the current time. Then, if a predetermined period of time, such as ten minutes, passes without the primary server 102 sending a heartbeat message to the standby server 104, this timer will lag the present time as indicated by a real time clock on the standby server 104 and will time out, causing the standby server 104 to take over control from the primary server 102.

From step 422, the POST code 302 then proceeds to step 424 in FIG. 5B. At step 424, the POST code 302 determines whether there is a cable fault on the serial link 108, either at the standby server 104 end or the primary server 102 end. If there is a cable fault, control proceeds to step 426 where a message is displayed indicating that cable fault, the timer is reset to prevent an inadvertent timeout, and control then loops to step 424.

If at step 424 it was determined that there was no cable fault, control then proceeds to step 428, where the standby server 104 determines whether a serial ATN, or attention, sequence has been received from the primary server 102 over the serial link 108. If so, this indicate the primary server 102 has sent a message, which is handled by the software of FIG. 5C discussed below. If not, control then proceeds to step 430, where the standby server 104 determines whether its status EV is set. If the status EV is not set, then the standby server 104 is presently not timing heartbeats from the primary server 102. Control then proceeds to step 432, where a message is displayed indicating that the standby server 104 is attempting to establish serial communications with the primary server 102, but that the user can cause the standby server 104 to assume control from the primary server 102 by pressing a key. Proceeding to step 434, if the user did hit a special key, control proceeds to step 462 in FIG. 5C discussed below, where the standby server 104 switches the storage system 106 and boots the NOS. Otherwise control proceeds from step 434 to step 424, where the loop is repeated.

If the status EV was determined to be set at step 430, the standby server 104 is presently timing heartbeats from the primary server 102. In that case, control proceeds from step 430 to step 436, where it is determined whether the last reset of the standby server 103 was due to an ASR timeout, or automatic server recovery timeout. This is determined by examining the ASR EV. If this is true, then when the standby server 104 was last running, it must have been running the NOS rather than simply running in the POST code 302. This could only be true if it had assumed control from the primary server 102. Therefore, the standby server 104 should boot the NOS immediately, so control proceeds from step 436 to step 438, where the timer is reset so that it does not inadvertently time out, and then control then proceeds to step 462 in FIG. 5C, where control will be switched from the primary server 102 to the standby server 104 and the NOS will be booted.

If at step 436 the last reset was not caused by an ASR timeout, control proceeds to step 440, where a message is displayed indicating that the user can hit a key to switch to the secondary server 104 and boot the NOS. Proceeding to step 442, if the timer count has expired, or if the user has hit a special key to switch and boot, control proceeds to step 438, where the timer count is again reset, and control will proceed to booting. If the timer has not expired at step 442, control proceeds to step 424 to repeat the loop.

Turning to FIG. 5C, two portions of the POST code 302 are shown. The first processes a serial command received from the primary server 102 at step 428 of FIG. 5B, and the second is a switch now and boot command that is entered from step 438 or 434 in FIG. 5B, or from step 460 of FIG. 5C.

Before addressing the various commands that are handled by the case statement of step 450, it is helpful to describe the communication packets provided over the serial link 108 in the disclosed embodiment. These communication packets take the following form:

ATN [Command] ET

"ATN" is the attention portion of the communication packet, and "ET" is the end of transmission portion. The "[Command]" portion contains the command being communicated between the primary server 102 and the standby server 104. In the disclosed embodiment, the following commands are used:

| Command | Description |
|---------|-------------|
| 104 | Positive acknowledgement of a transmission (i.e., "ten-four") |
| NEG | Negative acknowledgement of a transmission |
| DSS | Disable standby server 104 |
| AST | Activate standby server 104 heartbeat timer |
| TIK | Heartbeat command |
| SWN | Switch the storage system 106 and boot |

These commands will be further described in conjunction with FIG. 5C.

From step 428, control proceeds to step 450, a case statement based on the serial command received from the primary server 102. Control branches from step 450 to either step 452, 454, 456, 458 or 460 depending on the command.

Control proceeds to step 452 if a "DSS", or disable standby server, command has been sent. At step 452, the timer is disabled. This is done by both setting the timer to the current time and clearing the status EV. Clearing the status EV has the effect of disabling the timer. This is because at step 430 in FIG. 5B, control will not proceed to steps 436 and 442, which check the timer and then switch and boot if the appropriate amount of time has passed. Instead, control will proceed from step 430 to step 432, where the use is asked if a switch to the standby server is desired. Thus, the "DSS" command prevents the standby server 104 from seizing control from the primary server 102.

Control proceeds to step 454 on an "AST", or activate standby timer, command. In this case, the status EV is set, indicating that heartbeat commands must be sent from the primary server 102 to avoid a timeout, and timer is initialized with the current time to prevent an inadvertent timeout.

Control proceeds from step 450 to step 456 if the command from the primary server 102 was not recognized. At step 456, the standby server 104 sends a "NEG", or negative acknowledge, command causing the primary server 102 to resend the previous command.

Control proceeds to step 458 on receipt of a "TIK", or heartbeat. At step 458, the timer is reset with the current time, causing the timeout period to restart. If the timer is periodically "tickled" by the heartbeat it will be appreciated that the timer count at step 442 will not have expired, and therefore the secondary server 102 will not switch the relays in the storage system 106 and then boot the NOS.

Control proceeds to step 460 on an "SWN", or switch now, command. From step 460, as well as from steps 434 and 438 in FIG. 5B, control proceeds to step 462, which is the switch now sequence. At step 462, the standby server 104 beeps and waits 30 seconds for a possible user abort key before switching the relays of the storage system 106. After 30 seconds, control proceeds to step 464, where it is determined whether the switch sequence was aborted or not. If aborted, control then proceeds to step 424 of FIG. 5B, as the user has aborted the switch command. If at step 464 there was no abort but there was instead a 30 second timeout, control proceeds to step 466, where the timer is reset to prevent a spurious timeout, and multiple resets are sent over the second SCSI cable 112 to the storage system 106, causing the storage system 106 to switch it relays to the second SCSI cable 112 to the standby server 104. Control then proceeds to step 468, where the NOS is booted from the storage system 106.

From steps 452, 454, 456, and 458, control loops back to step 424 in FIG. 5B. Although not shown, steps 452, 454, 458, and 460 further send a "104", or acknowledge, command to the primary server 102, indicating a successful receipt of a transmitted packet.

The NOS Health Driver Code

Figure 6:
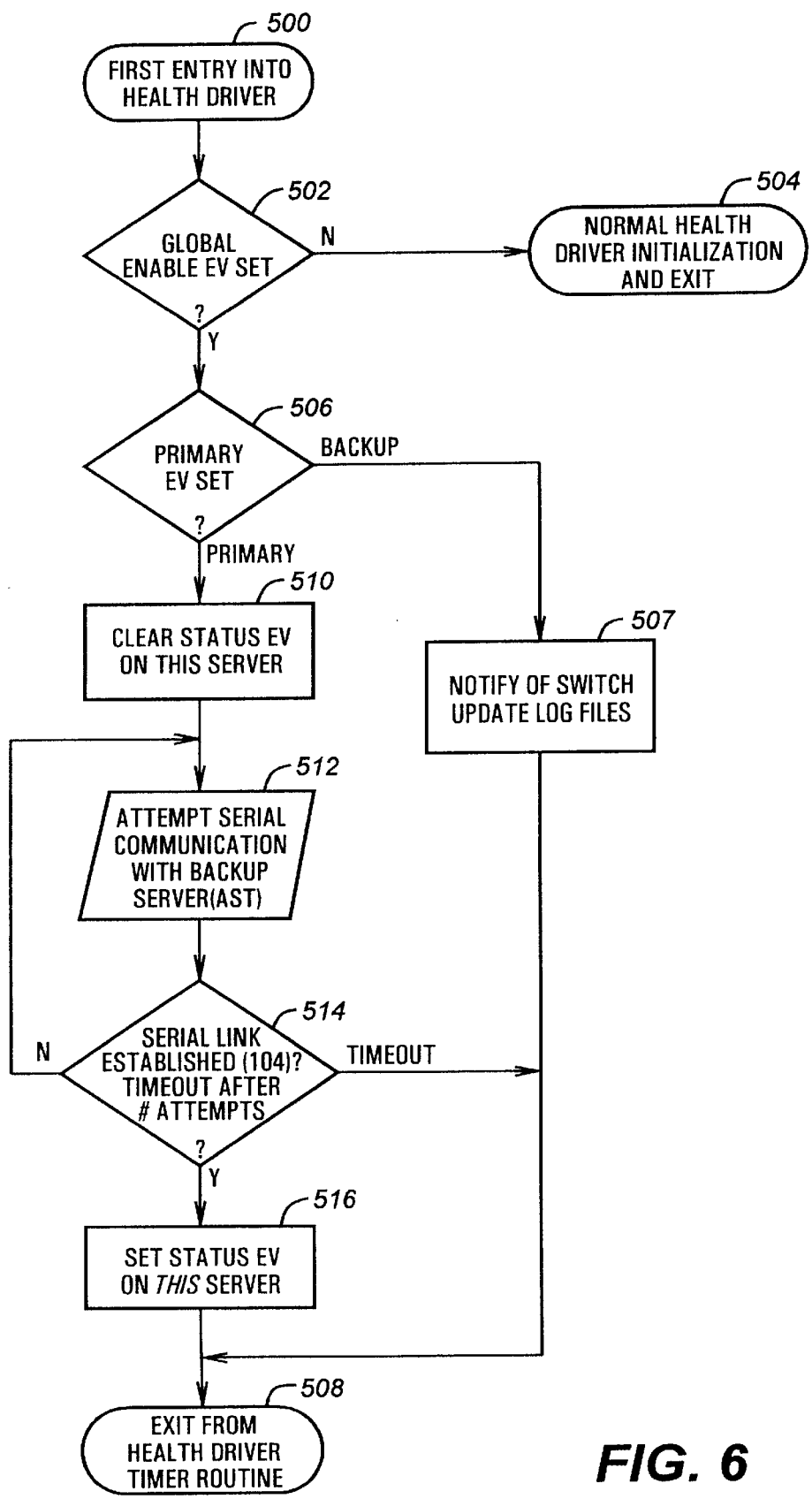
FIGS. 6–8 are flowchart illustrations of network health driver routines executed by the primary server/standby server configurations according to the invention.
Figure 7:
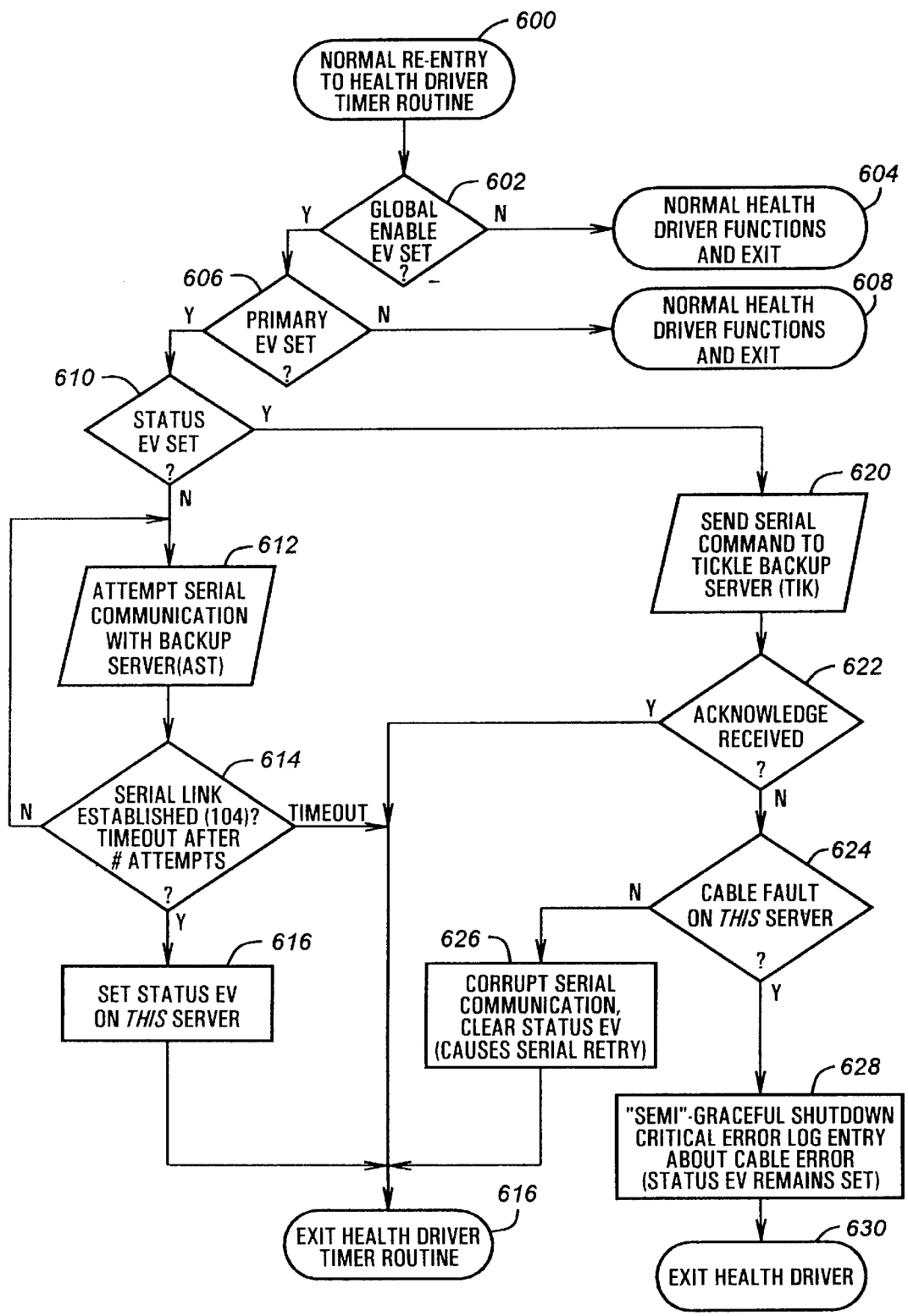
Figure 8:
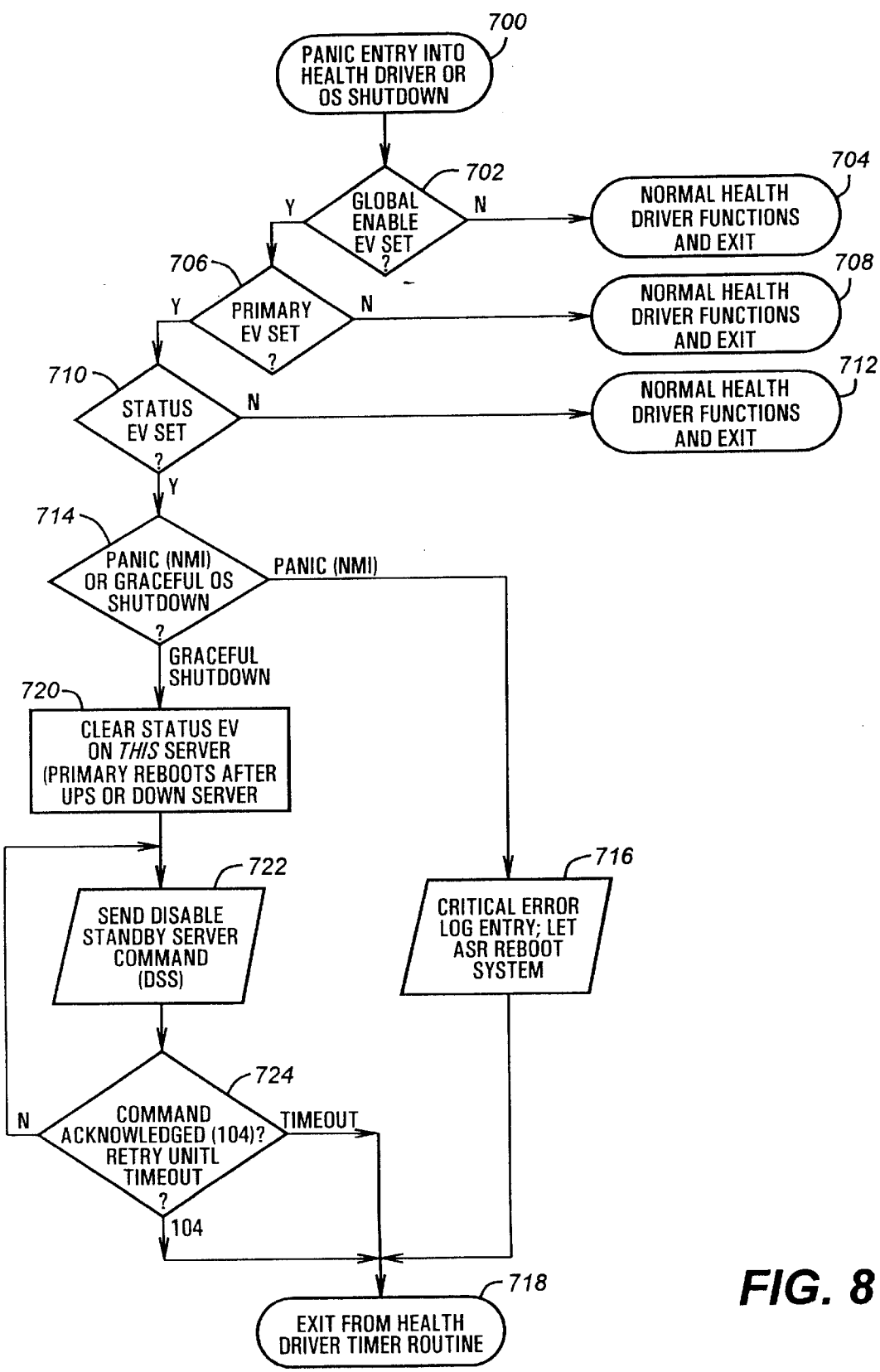

Turning to FIGS. 6–8, flowcharts are shown of the code executed by the NOS to periodically send a heartbeat to the secondary server 102. Again, both the primary server 104 and the secondary server 102 execute this code because both boot the NOS from the storage system 106, but as will be seen, a number of steps are bypassed when the code is running on the standby server 104.

The software of FIGS. 6–8 is preferably implemented as tasks in the NOS. On Netware, these would be implemented as NLMs, or netware loadable modules. In Windows NT, these would be implemented as system services. Either way, these routines are periodically called by the NOS through what is known as the "health driver," described in U.S. Pat. No. 5,390,324, which was previously incorporated by reference.

Turning to FIG. 6, a heartbeat initialization routine 500 is called on the first entry into the health driver. Proceeding to step 502, it is determined whether the global enable EV is set. If not, then secondary server monitoring is not implemented, so the control proceeds to step 504, where normal health driver initialization functions are executed and control returns to the NOS.

If at step 502 the global enable EV is set, control proceeds to step 506, where it is determined whether the primary EV is set. If not, then the heartbeat initialization routine 500 is currently executing on the standby server 104, so control proceeds to step 507. At step 507, the system administrator is notified that a switch over has occured, and the fact of the switch over is logged in any desired log files.

Control then proceeds to step 508. At step 508, the health driver performs normal initialization code and control returns to the NOS. If the NOS software is running on the standby server 104, there is no need to attempt to establish a serial link with the primary server 102, because the primary server 102 is presumed not to be running.

If at step 506 it was determined that the primary EV is set, control proceeds to step 510 where the status EV is cleared on this server, which must be the primary server 102. The status EV remains cleared until communications are established with the standby server 104.

Proceeding to step 512, the primary server 102 attempts to establish serial communications with the standby server 104 over the serial cable 108. It sends "AST" commands, which are intended to activate the timer on the standby server 104 (see step 454 of FIG. 5C). After sending an "AST" command at step 512, control proceeds to step 514, where the primary server 102 waits for an appropriate amount of time to determine whether the standby server 104 has sent an affirmative acknowledge command ("104"). If it has not, and the primary server has sent less than a predetermined number of "AST" commands at step 512, control loops to step 512, where another "AST" command is sent to the standby server 104.

If at step 514 a predetermined number of "AST" commands have been sent at step 512, then the heartbeat initialization routine 500 on the primary server 102 quits attempting to establish serial communications with the standby server 104, and instead proceeds to step 508, where the health driver performs normal initialization and control returns to the NOS. If at step 514 serial communications were established, as indicated by receipt of a "104" command from the standby server 104, control proceeds to step 516, where the status EV is set on the primary server 102. The status EV is set to indicate that the standby server 104 is responding and is operating in its standby mode. It is now incumbent on the primary server 102 to send periodic heartbeats ("TIKs") to the standby server 104. Referring to step 458, FIG. 5C, such heartbeats will reset the timer in the standby server 104, preventing it from switching the storage system 106 and booting the NOS.

After setting the status EV at step 516, control proceeds to step 508, where normal health driver initialization functions are performed and control returns to the NOS.

Turning to FIG. 7, this flowchart illustrates a heartbeat routine 600 that is periodically called by the health driver, which is in turn periodically called by the NOS. Control first proceeds to step 602, where it is determined whether the global enable EV is set. If not, control proceeds to step 604, where control returns to the health driver, where normal health driver functions are performed and then control returns to the NOS.

If the global enable EV is set at step 602, the standby server mode is enabled, so control proceeds to step 606, where it is determined whether the primary EV is set. If not, then the heartbeat routine 600 is currently running on the standby server 104, so control proceeds to step 608, where normal health driver functions are performed and then control returns to the NOS. Because the primary server 102 is not running, there is no need to attempt to communicate with the primary server 102.

From step 606, if the primary EV is set, then the heartbeat routine 600 is running on the primary server 102. Control then proceeds to step 610, where it is determined whether the status EV is set. If the status EV is not set, control then proceeds to step 612, because this indicates that at step 512 and 514 of FIG. 6, communications were not established with the standby server 104. At step 612, the primary server 102 again attempts to establish communications with the standby server 104 by sending "AST" commands, requesting that the standby server 104 activate its timer. Control then proceeds from step 612 to step 614, where, if the standby server 104 did not confirm the "AST" with a "104" command, and less than a predetermined number of attempts have been made to establish communication, control loops to step 612. If at step 614 a predetermined number of attempts have been made, the secondary server 104 is not responding, so control proceeds to step 616, where the heartbeat routine 600 exits and returns to the health driver to execute normal health driver functions. If an affirmative "104" command was received at step 614 from the standby server 104, communications have been established with the standby server 104, which is now acting in its standby role, so control proceeds to step 618, where the status EV is set, indicating as such. From step 618, control then proceeds to step 616.

If at step 610 the status EV is set, this indicates the standby server 104 is acting in its standby role and expects heartbeats from the primary server 102. Control then proceeds to step 620, where the standby server 104 is "tickled" with a heartbeat command ("TIK") over the serial link 108, which, as previously discussed in conjunction with FIG. 5C at step 458, causes the standby server 104 to reset its timer.

Proceeding to step 622, if an acknowledge (i.e., "104") was received from the standby server 104, control then proceeds to step 616. If at step 622 an acknowledge was not received, control proceeds to step 624. At step 624, the primary server 102 determines whether a cable fault has occurred on itself or on the standby server 104. This is done using normal serial communications techniques that determine whether the cable is disconnected at the primary server 102 or the standby server 104. If the cable fault is not on this server, the primary server 102, control proceeds to step 626, where the status EV is cleared, causing a serial retry on the next entry into the heartbeat routine 600. On the next entry into the heartbeat routine 600, at step 610 control will branch to step 612, attempting to reestablish communications with the standby server 104. If at step 624 it was determined that the cable fault was on the primary server 102, control proceeds to step 628, where a "semi"-graceful shutdown is initiated, and the cable fault is logged to a critical error log as discussed in U.S. Pat. No. 5,390,324. The shutdown is only "semi"-graceful because although the NOS is gracefully shutdown, the status EV remains set, causing a diagnostic message to appear on the primary server 102 when rebooted as discussed in step 416 of FIG. 5A. Because the standby server 104 is not receiving heartbeats, it will take over control from the primary server 102 as discussed in FIGS. 5A–5C. For this reason, the primary server 102 is shutdown at step 628. A graceful shutdown is initiated using a flag which will be processed in the software of FIG. 8. Control then proceeds to step 630, where normal health driver functions are performed.

It will be appreciated that a shutdown is necessary as illustrated in steps 624, 628, and 630 because the standby server 104 will not be receiving a heartbeat message, and so will boot its NOS. To avoid conflicts on the network 100, the primary server 102 must therefore shut down its NOS and relinquish control to the standby server 104. This shutdown further avoids data loss when the storage device 106 switches from the primary server 102 to the standby server 104, as it results in files being closed, caches being flushed, and the operating system being gracefully exited.

Turning to FIG. 8, a flowchart of a system shutdown routine 700 shutdown that is entered when there is a system failure or a normal shutdown has been requested. The shutdown routine 700 first proceeds to step 702, in which the global enable EV is checked. If the global enable EV is not set, control proceeds to step 704, where normal health driver functions are performed followed by an exit, which in this case will be an operating system shutdown. Of note, the status EV will remain set, causing the standby server 104 to again boot the NOS on restart unless heartbeat messages are received from the primary server 102, as discussed above in conjunction with FIGS. 5A–5C. From step 702, if the global enable EV is set, control proceeds to step 706, in which the primary EV is checked. If the primary EV is not set, then the shutdown routine 700 is operating on the standby server 104, so no other action is needed. Therefore, control proceeds to step 708, where normal health driver functions are performed followed by an exit, again in the form of an operating system shutdown.

If at step 706 the primary EV is set, control then proceeds to step 710, where the status EV is checked. If the status EV is not set, the standby server 104 is not acting in its backup role, so control proceeds to step 712, where normal health driver functions are performed, and an exit in the form of an operating system shutdown initiated.

If at step 710 the status EV is set, then the standby server 104 is acting in its standby role and expects heartbeats. Control proceeds to step 714, where it is determined whether this is a graceful operating system shutdown or a "panic" shutdown. A panic shutdown would typically be in the form of an NMI which will eventually cause a timeout of the ASR timer. If the shutdown is a panic shutdown caused by an NMI (non-maskable interrupt), control proceeds from step 714 to step 716, where an entry is made in the critical error log and the ASR timer will then reboot the system after a predetermined period of time. Control then proceeds to step 718, in which the shutdown routine 700 is exited. The status EV remains set, so on the next restart, the user will be advised to run diagnostics at step 416 discussed in conjunction with FIG. 5A. Of further note, if a truly catastrophic failure occurs in which none of the shutdown routine 700 is executed, the standby server 104 will stop receiving periodic heartbeats from the primary server 102, and control will be seized from the primary server 102 on a timeout of the timer discussed in conjunction with FIGS. 5A–5C. When the primary server 102 does reboot, the status EV will still be set, so the user will be advised to run diagnostics as illustrated in step 416 at FIG. 5A. Further, stopping at step 416 avoids certain "race" conditions. If the primary server 102 shutdown because of a software error, it would still be able to attempt to boot after the shutdown. If the boot procedure was not halted at step 416, the primary server 102 could conceivably attempt to again boot before the standby server 104 had timed out and attempted to boot itself, resulting in a continuing cycle of software failures followed by reboots on the primary server 102 without the standby server 104 ever seizing control.

If at step 714 it was determined that a graceful operating system shutdown has been initiated (by a user, for example), control then proceeds to step 720. This shutdown is truly "graceful" because the timer in the standby server 104 will be disabled, preventing a switch to the standby server 104. At step 720, the status EV is cleared on this server, so that when the primary server 102 is rebooted, control will pass from step 408 at FIG. 5A through steps 410 and on to step 412. That is, the user will not be advised to run diagnostics, because there was not a system failure on the primary server 102.

From step 720, control proceeds to step 722, in which the standby server 104 is disabled by the primary server 102 sending a disables standby server command ("DSS") over the serial link 108 to the standby server 104. This will cause the standby server 104 to reset its status EV, preventing it from automatically assuming control from the primary server 102.

Proceeding from step 722 to step 724, if the "DSS" command has not been acknowledged, but the primary server 102 has not attempted to disable the standby server 104 more than a predetermined number of times, control loops back to step 722 for another try. If at step 724 the "DSS" command has not been acknowledged after a predetermined number of attempts, then the communication link has failed with the standby server 104, so control proceeds to step 718. If an affirmative response in the form of a "104" command has been received from the standby server 104, control proceeds from step 724 to step 718.

Example of System Operation

The operation of the standby server 104 in conjunction with the primary server 102 will be appreciated upon review of the preceding FIGS. 5A–8. The standby server 104 will continue running in its POST code 302 described in FIGS. 5A–5C until the primary server 102 fails to send a heartbeat within a predetermined length of time, preferably 10 minutes. At this point, the standby server 104 will send a series of resets to the storage device 106, causing the storage device to switch SCSI ports from the first SCSI cable 110 to the second SCSI cable 112, which is connected to the standby server 104. The standby server 104 will then boot the NOS from the storage system 106 and run in place of the primary server 102 until the system supervisor has performed maintenance on the primary server 102, has gracefully shut down the standby server 104, and has rebooted the primary server 102 followed by the standby server 104. Upon booting the primary server 102 after such failure, the user will be advised to run diagnostics, but will then be allowed to boot the NOS. A communications link will then once again be reestablished with the standby server 104.

Further, if the standby server 104 boots the NOS, the data recovery will typically occur at three levels. First, if a smart storage system is used as the storage system 106, the controller within the standby server 104 will typically attempt to rebuild any data that may have been corrupted at a storage media level. Second, a typical NOS upon startup generally examines all storage medial for corruption, and attempts to recover data at the operating system level. Third, many database applications, such as Oracle, attempt to recover lost transactions at an applications level.

It will also be appreciated that the standby server 104, because it is booting identical code from the storage system 106, appears on the network 100 in all ways identical to the primary server 102. Thus, any other systems on the network will need no modification to continue operating in conjunction with the standby server 104.

Finally, because the standby server 104 seizes control from the primary server 102, system reliability is increased, because the primary server 102 does not have to perform any positive steps upon failure to effect the switch to the standby server 104 and because the primary server 102 will then have no physical access to the storage system 106.

It will be appreciated that by modifying the code, the primary server 102 could resume control from the standby server 104 without shutting down the standby server 104. This would require additional commands, for example, to be sent from the primary server 102 to the standby server 104, instructing the standby server 104 through its health driver routines that it must shut down. The primary server 102 would then send a series of resets to the storage system 106, causing the storage system to switch back from the second SCSI cable 112 to the standby server 104 to the first SCSI cable 110 to the primary server 102. According to the disclosed embodiment, however, this automatic resumption of service by the primary server 102 is not implemented, because the system supervisor will generally have an opportunity to shut down the standby server 104 at a predetermined time in a graceful way, such as in the evening.

Further, as discussed in conjunction with FIG. 3, it will be appreciated that multiple serial links can be connected to the standby server 200 to service multiple primary servers, illustrated by the first primary server 202 and the second primary server 204 in FIG. 3. This could be extended to an even larger number of primary servers, although additional serial ports would be necessary unless network messages are used as heartbeats, as illustrated in FIG. 2. One of ordinary skill in the art will appreciate how to adapt the code to provide for multiple primary servers. The POST code 302 of FIGS. 5A–5C would need to be slightly modified to handle heartbeats and timers for multiple primary servers.

Further, it will be appreciated that the serial link 108, or 214 and 216 of FIG. 3, could be eliminated by providing heartbeats over the network 100 itself. Referring back to FIG. 2, such an implementation is seen. This could further be used for multiple servers as discussed in conjunction with FIG. 3. In such a system, rather than implementing the standby server 104 code as the POST code 302, it would be preferable to have, for example, a local boot drive or disk on the standby server 104 that would provide a small, bootable NOS, because network driver software must be installed and running for the standby server 104 to receive such packets of information over the network 100. One of ordinary skill in the art will readily appreciate how to adapt the POST code 302 of FIGS. 5A–5C for such a system.

Cabling

Figure 9:
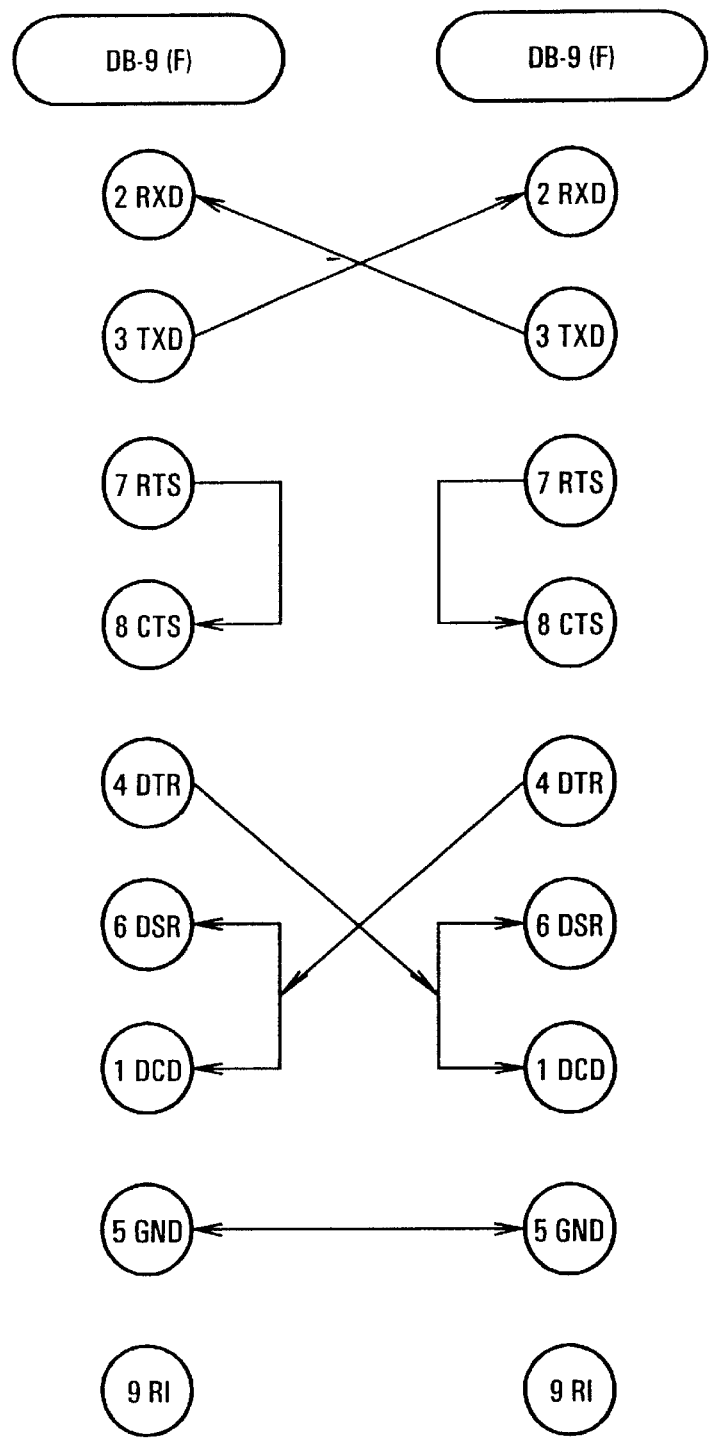
FIG. 9 is a block diagram of the cabling connections on the serial link according to the invention.

Turning to FIG. 9, a typical cabling diagram for the serial link 108 is illustrated. The receive data line (RXD) for connection to the primary server 102 is connected to the transmit data line (TXD) of the standby server 104, and vice versa. The request to send (RTS) and clear to send (CTS) lines are looped back upon themselves. Each data terminal ready (DTR) line is connected to the opposing data set ready (DSR) and data carrier detect (DCD) lines, and the grounds (GND) are connected. This will all be understood by those of ordinary skill in the art. Further, a great variety of other types of links other than serial links could be implemented.

The Storage System

Figure 10:
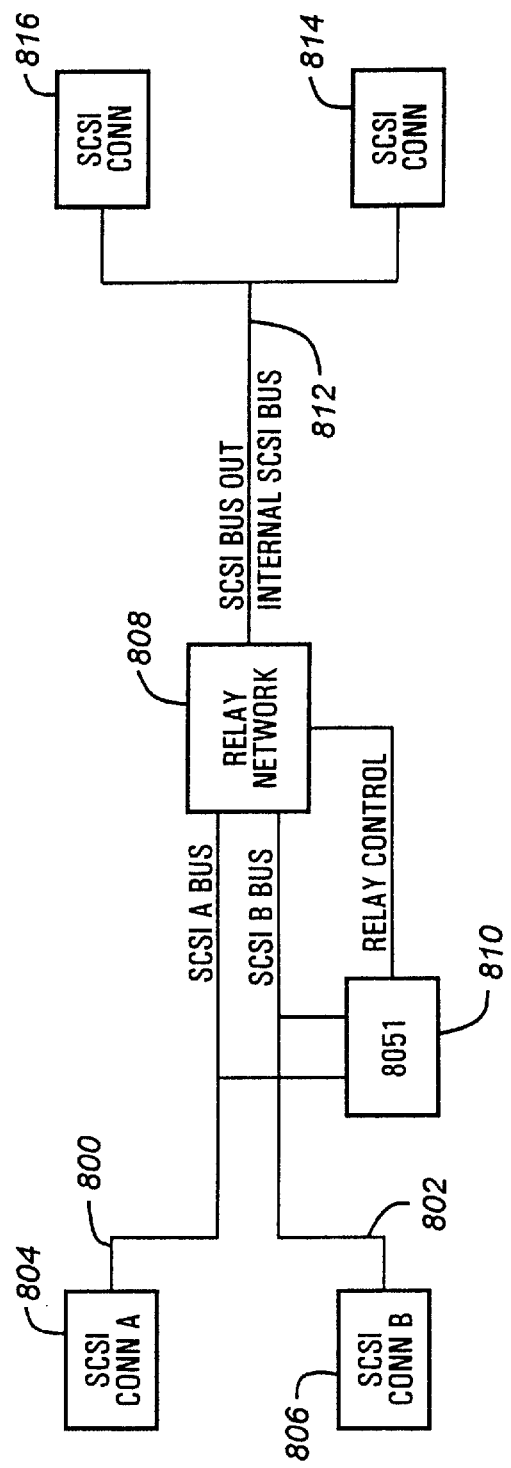
FIG. 10 is a hardware block diagram of the components of a storage system according to the invention.

Turning to FIG. 10, a block diagram of hardware implemented in the storage system 106 is shown The storage system 106 implements two SCSI buses, a SCSI A bus 800 and a SCSI B bus 802. The SCSI A bus 800 connects to a SCSI connector A 804, and the SCSI B bus 802 connects to a SCSI connector B 806. According to the disclosed embodiments of FIGS. 1 and 2, the SCSI connector A 804 is then connected to the primary server 102 via the first SCSI cable 110, and the SCSI connector B 806 is then connected to the standby server 104 via the second SCSI cable 112. The SCSI connectors A 804 and B 806 could be a wide variety of SCSI connectors, such as either wide or narrow.

As will be appreciated from the previous discussion of the primary server 102 and the standby server 104, the storage system 106 must switch from the SCSI A bus 800 to the SCSI B bus 802 to switch control from the primary server 102 to the standby server 104. This switching is implemented by a relay network 808, which is controlled by a microcontroller 810, which in the disclosed embodiment is an 8051 series microcontroller. The relay network 808 selectively couples the selected SCSI A bus 800 or SCSI B bus 802 to an internal SCSI bus 812, which in turn connects to a SCSI connector 814 and to a SCSI connector 816, for connection to a wide variety of SCSI devices within or external to the storage system 106.

Hardware Details of the Storage System

Figure 11:
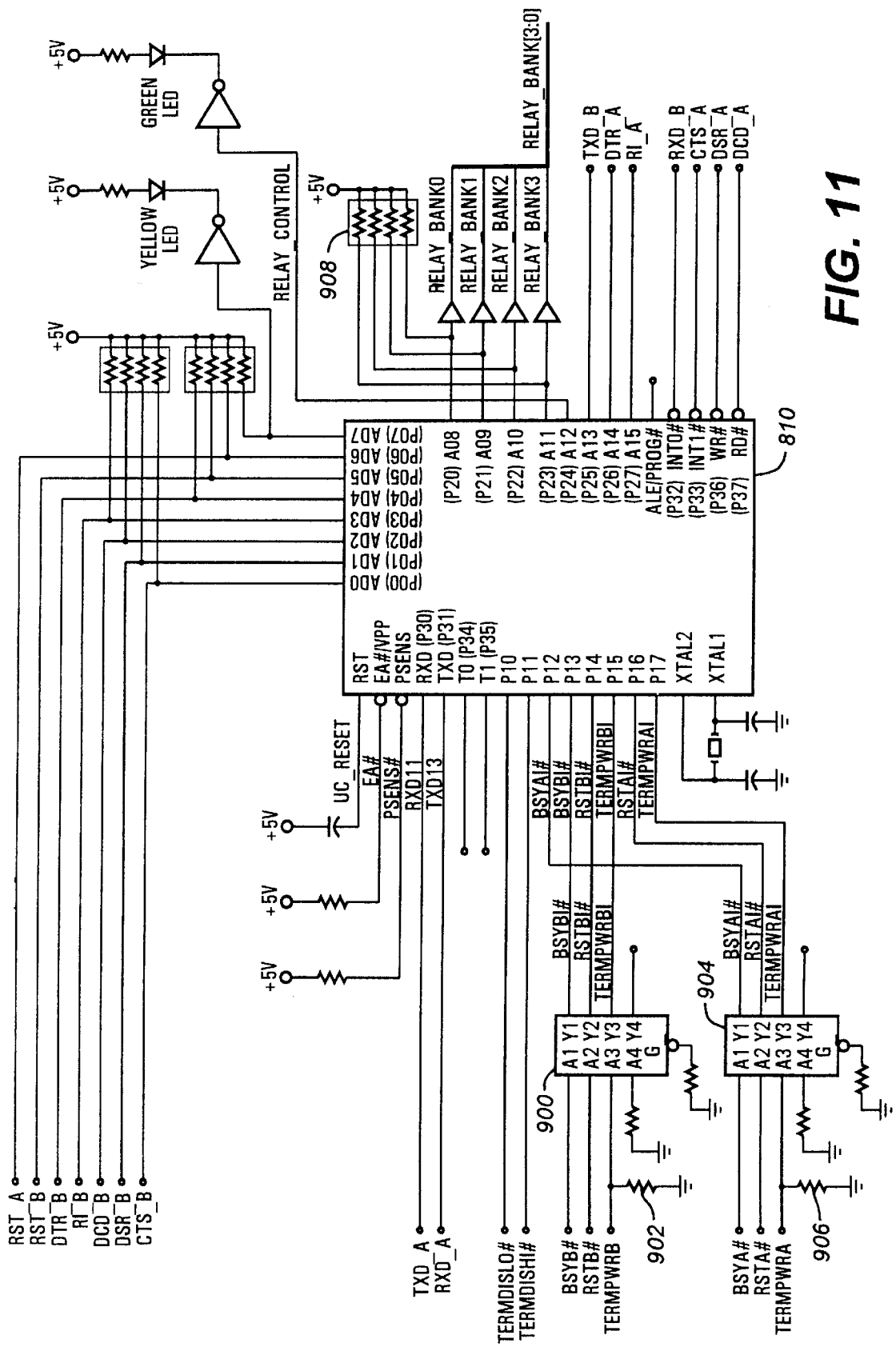
FIG. 11 is a schematic illustration of the microcontroller connections in a storage system implemented according to the invention.

Turning to FIG. 11, the implementation of the microcontroller 810 is further illustrated. Of primary interest are the SCSI B bus 802 BSYB#, RSTB#, and TERMPWRB signals, and the corresponding signals for the SCSI A bus 800. The BSYB# signal is the standard SCSI busy signal BSY# provided on the SCSI B bus 802, which is true (active low as designated by the "#") when the SCSI B bus 802 is busy. The RSTB# signal is similarly provided on the SCSI B bus 802, and is the standard SCSI reset signal RST#, which when true resets the bus. The TERMPWRB signal is similarly the SCSI termination power for terminators on the bus. These signals are provided to a buffer 900, with the TERMPWRB signal further being coupled to ground via a pulldown resistor 902. The corresponding SCSI A bus 800 signals are provided to a buffer 904, again with TERMPWRA being coupled to ground via a pulldown resistor 906. The buffers 900 and 904 provide corresponding internal BSYBI#, RSTBI#, TERMPWRBI, BSYAI#, RSTAI#, and TERMPWRAI signals to the microcontroller 810 via port inputs P1.2–P1.7. When the microcontroller 810 is an 8051, these are port inputs that are adaptable to a wide variety of functions as will be discussed in conjunction with the flowcharts of FIGS. 14A and 14B below.

The microcontroller 810 then provides relay control signals RELAY_BANK[3:0] out through its output ports P2.0–P2.3, after buffering through buffers 906. Further, the output ports P2.0–P2.3 are typically of an open collector configuration, and are therefore pulled up to 5 volts by pull-up resistors 908. These will be further discussed in conjunction with FIGS. 12A–12C below.

Figure 12A:
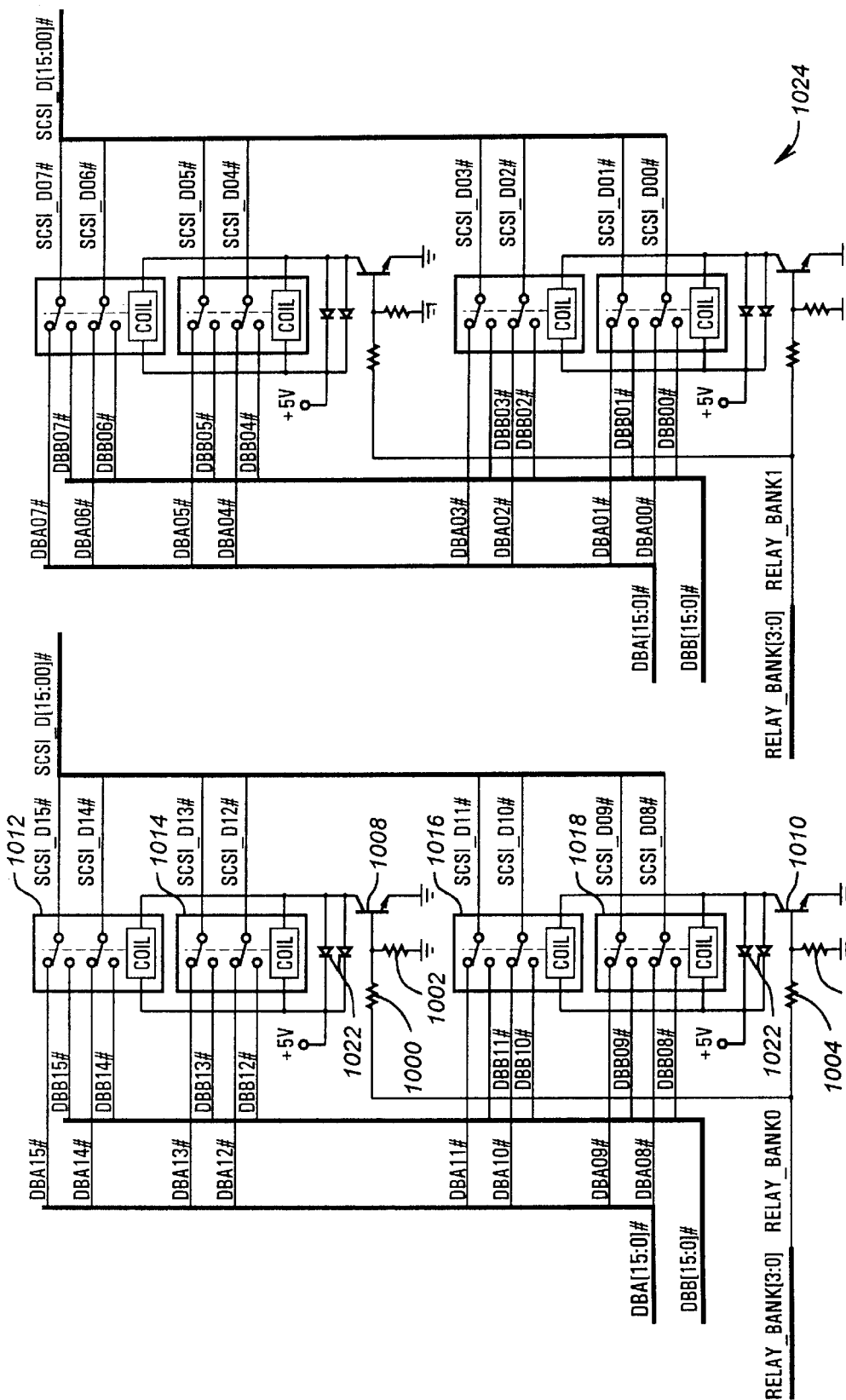
FIGS. 12A and 12B are schematic illustrations of relay circuitry implemented in a storage system according to the invention.

Turning to FIG. 12A, typical relay circuitry used to implement the relay network 808 according to the invention is shown. The RELAY_BANK0 signal is provided through four biasing resistors 1000–1006 to the bases of two switching transistors 1008 and 1010. When the RELAY_BANK0 signal is high, that signal drives the base of the switching transistors 1008 and 1010 high, forcing the collector low. This in turn energizes the coil of four double-pole double-throw relays 1012–1018. The collector of the switching transistor 1008 is coupled to the negative side of the coils of the double-pole double-throw relays 1012 and 1014, and the collector of the switching transistor 1010 is likewise connected to the negative side of the coils of the double-pole double-throw relays 1016 and 1018. The positive side of the coils of each of the double-pole double-throw relays 1012–1018 is pulled high to +5 volts, with flyback diodes 1020–1022 being coupled across the coils of each of the double-pole double-throw relays 1012–1018.

One group of poles of the double-pole double-throw relays 1012–1018 are connected to the SCSI A bus 800 data lines DBA[15:8]#, while the other poles of the double-pole double-throw relays 1012–1018 are connected to the corresponding data lines DBB[15:8]# of the SCSI B bus 802. Thus, the double-pole double-throw relays 1012–1018 switch between these data bus lines, coupling the selected set to the corresponding data lines of the internal SCSI bus 812, indicated here as SCSI_D[15:8]#.

Similar circuitry is provided for the remaining data lines of the SCSI A bus 800 and the SCSI B bus 802 by the circuitry illustrated by a circuitry block 1024. In circuitry block 1024, the RELAY_BANK1 signal switches the relays.

Figure 12B:
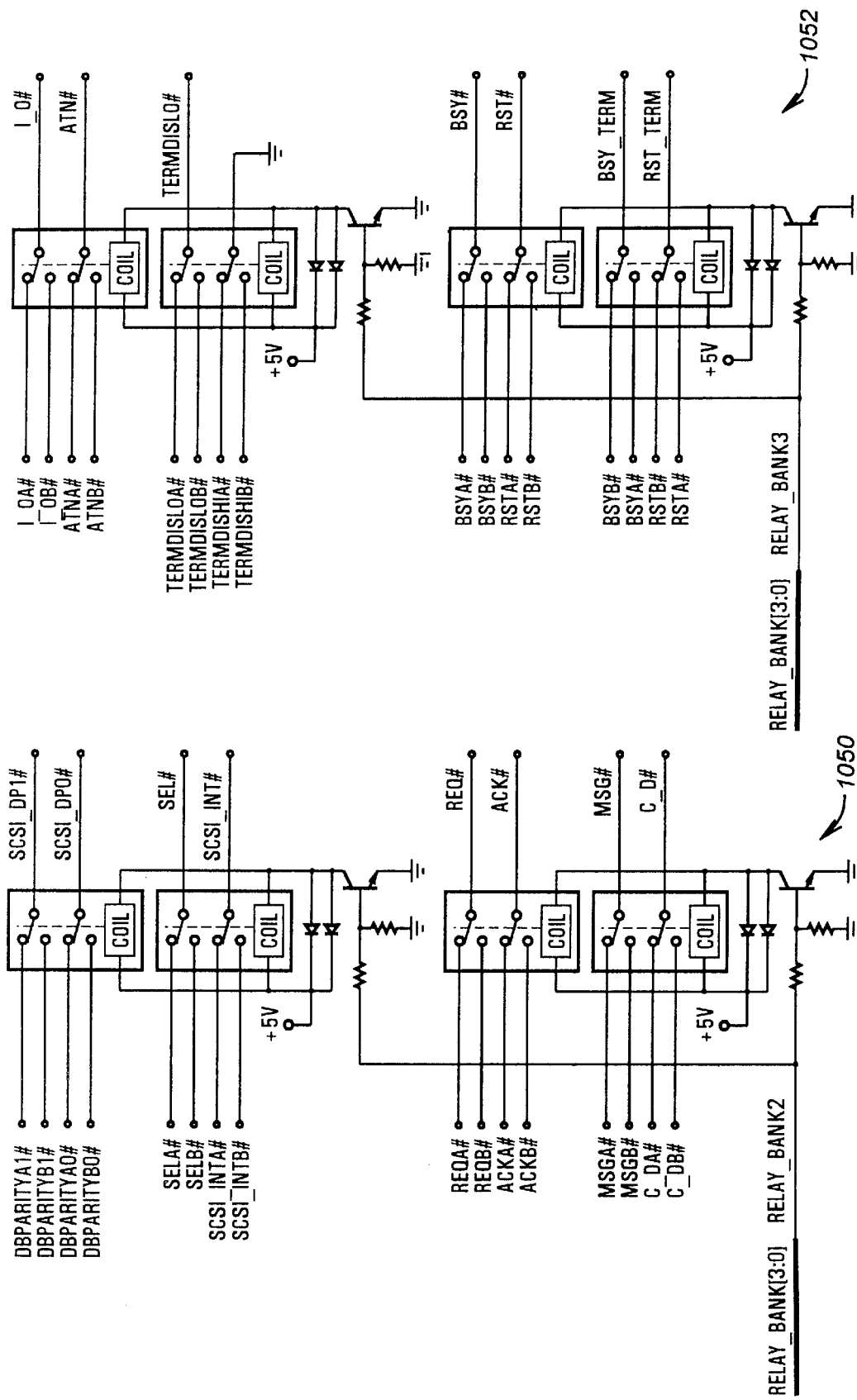

Turning to FIG. 12B, the RELAY_BANK2 and RELAY_BANK3 signals similarly switch between the control lines of the SCSI A bus 800 and the SCSI B bus 802, coupling the selected set to the control lines of the internal SCSI bus 812. The RELAY_BANK2 signal controls the lines within a circuitry block 1050, while the RELAY_BANK3 signal controls the lines in a circuitry block 1052.

Figure 13:
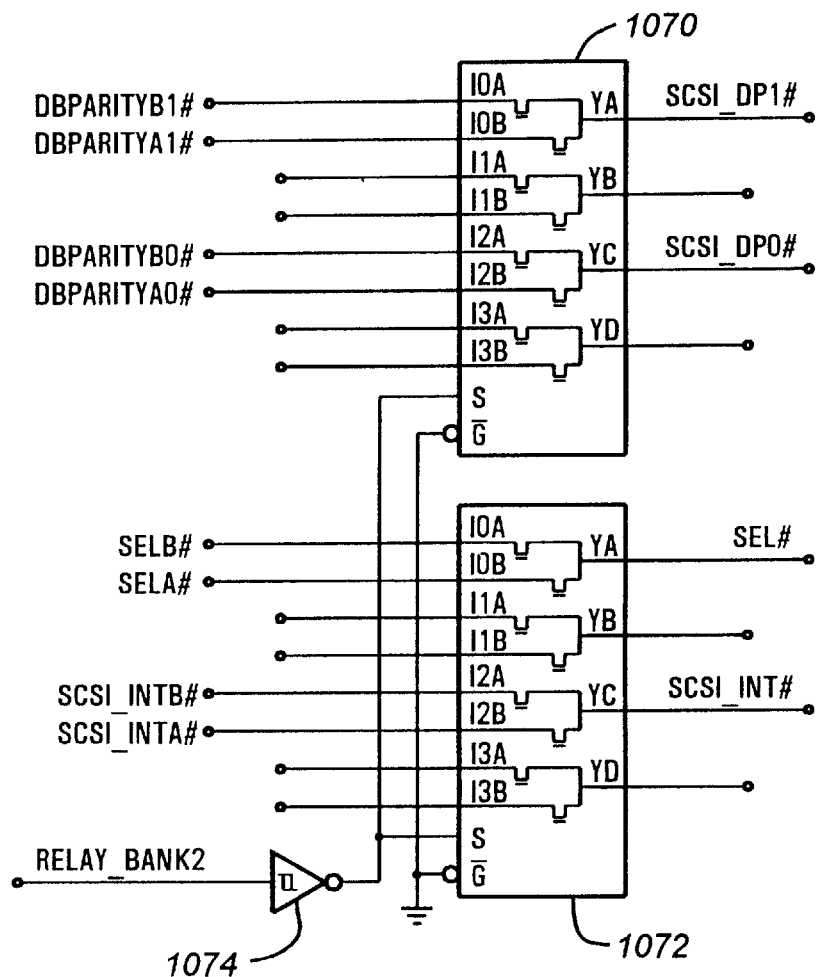
FIG. 13 is a schematic illustration of alternative circuitry to be used for relays in a storage system implemented according to the invention.

Although mechanical relays are shown in FIGS. 12A and 12B, referring to FIG. 13 it is seen that solid state relays or switches can instead be used. Illustrated is the RELAY_BANK2 signal controlling the control lines corresponding to the circuitry block 1050 of FIG. 12B. Instead of mechanical relays, two solid state relays 1070 and 1072 are switched by the output of a Schmitt triggered inverter 1074, which as its input receives the RELAY_BANK2 signal.

It will be appreciated that a wide variety of other relays can be used, such as transistor switches, FET switches, switched drivers, as well as optical switches if a fiber optic interface is used. Any technique that can selectively couple one bus another can be used as relays in the relay network 806.

The Microcontroller Software

Figure 14A:
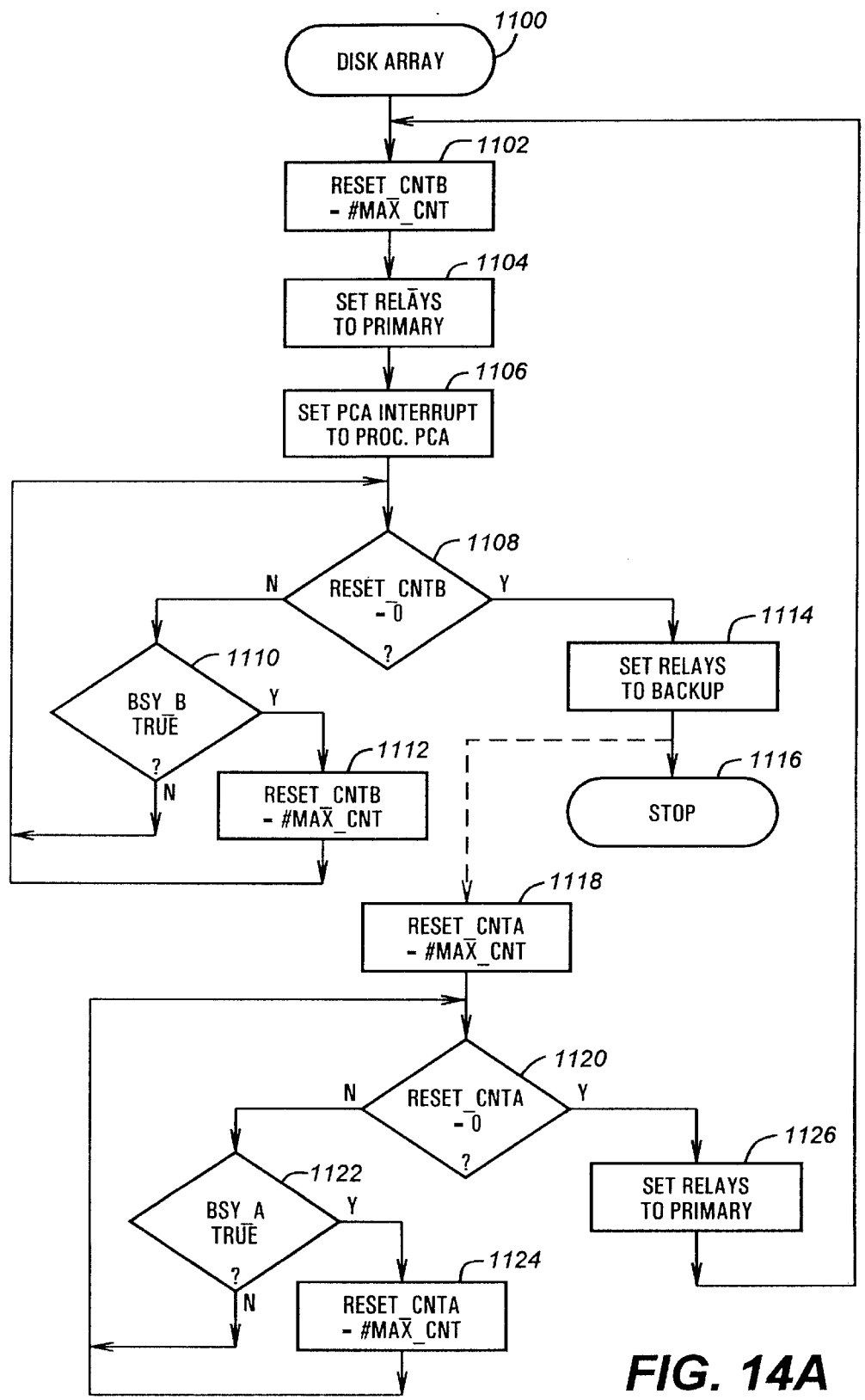
FIGS. 14A and 14B are flowchart illustrations of software executed by a microcontroller in a storage system implemented according to the invention.
Figure 14B:
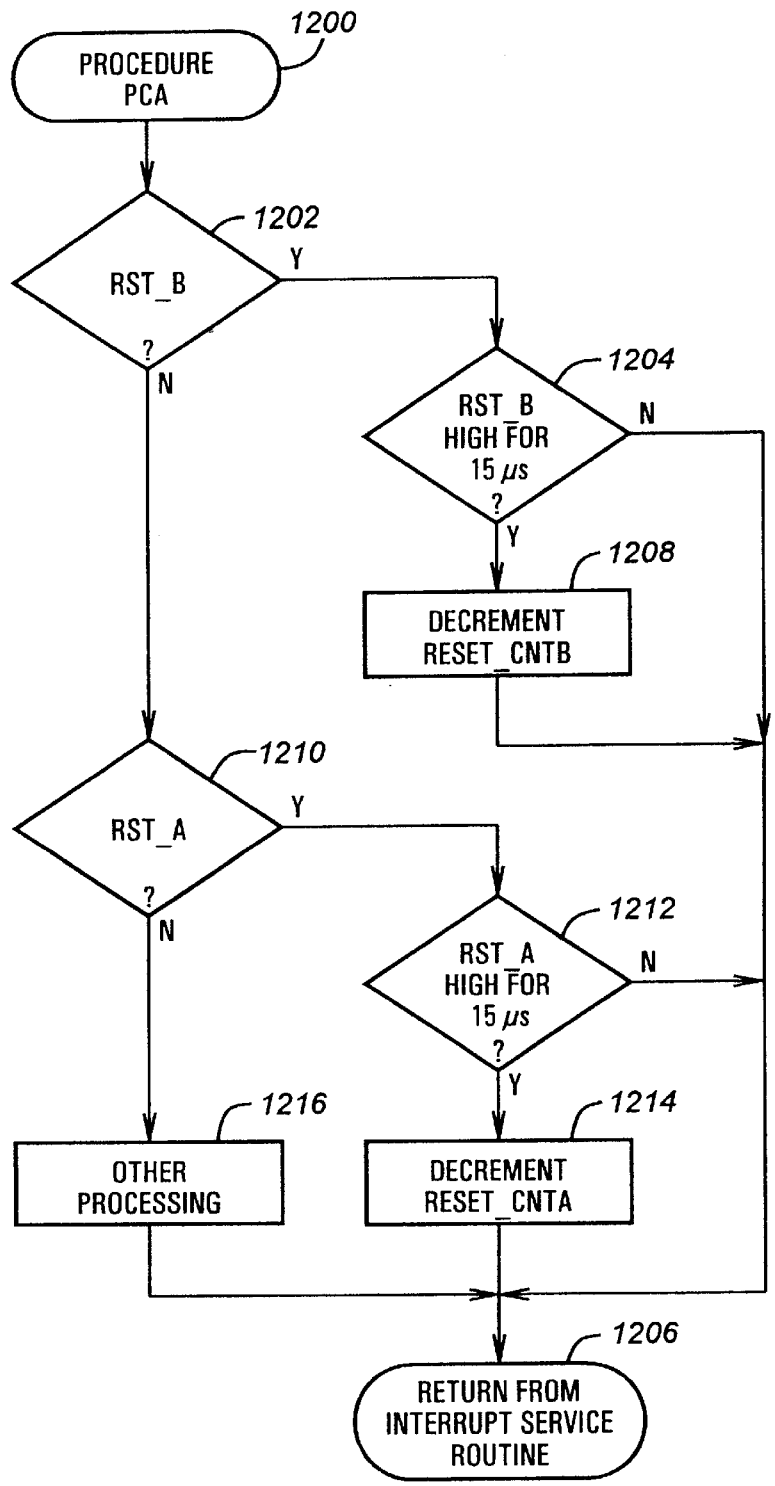

Turning to FIGS. 14A and 14B, shown are flowcharts of the software within the microcontroller 810 that controls the switching of the relays in the relay network 808. FIG. 14A shows a disk array routine 1100. Before providing the details of the disk array routine 1100, a general overview of its operation is in order. The relays in the relay network 808 switch from the SCSI A bus 800 to the SCSI B bus 802 when the standby server 104 sends a predetermined number of pulses over the reset line RSTB# of the SCSI B bus 802. By using the pulses of the RST# signal, an extra "out of band" signal is eliminated between the storage system 106 and both the standby server 104 and the primary server 102. In prior art systems, a serial link was provided from the standby server 104 and the primary server 102 to the storage system 106 to provide signals indicating when control should be passed from one of the SCSI cables 110 or 112 to the other. According to the disclosed embodiment, "in-band" signaling is instead used, utilizing the RSTA# and RSTB# signals to cause the switch to occur. Alternatively, TERMPWRA or TERMPWRB could instead be monitored, again providing in-band signaling. This will be discussed below.

Turning to the disk array routine 1000, control first proceeds to step 1102, where a variable RESET_CNTB is set to a maximum count #MAX_CNT. This is the number of pulses of the RSTB# signal necessary to cause the relays in the relay network 808 to switch from the SCSI A bus 800 to the SCSI B bus 802, and is set to eight in the disclosed embodiment. Proceeding from step 1102 to step 1104, the relays in the relay network 808 are set to the primary server 102 by setting the relays to route the SCSI A bus 800 lines to the internal SCSI bus 812 lines. This is accomplished by setting the P2.0–P2.3 outputs of the microcontroller 810 to a high value, which causes the relay network 808 to switch to the SCSI A bus 800.

Proceeding to step 1106, a "PCA" interrupt within the microcontroller 810 is set to vector to a PCA procedure 1200, discussed below in conjunction with FIG. 14B. The PCA interrupt is set to trigger when either the RSTAI# signal or the RSTBI# signal changes state. The PCA interrupt is thus coupled to the P1.4 and P1.6 inputs of the microcontroller 810 illustrated in FIG. 11, which receives these two signals.

Proceeding from step 1106 to 1108, the disk array routine 1100 determines whether RESET_CNTB is zero. Each time the RSTBI# signal transitions from a high value (false) to a low value (true) for a predetermined length of time, the value of RESET_CNTB is decremented by the PCA procedure 1200 discussed below in conjunction with FIG. 14B. That is, the PCA procedure 1200 counts the number of sequential resets over the SCSI B bus 802 and maintains that count in RESET_CNTB. If RESET_CNTB is not zero, control proceeds to step 1110, where it is determined whether BSYBI# is true. If BSYBIH is true, this indicates the SCSI B bus 802 is active, which further indicates that any current series of resets has been interrupted by activity on the SCSI B bus 802. This indicates that a valid series of sequential resets have not been sent over the SCSI B bus 802, so RESET_CNTB should again be initialized to the maximum count of #MAX_CNT. This is done by proceeding to step 1112, where RESET_CNTB is set to #MAX_CNT, reflecting that an uninterrupted stream of resets has not been received from the standby server 104 over the SCSI B bus 802. Control proceeds from step 1112 back to step 1108 to repeat the sequence.

If at step 1110 BSYBI# is false, or high, this indicates that the presently occurring sequence of resets on the SCSI B bus 802 has not been interrupted by SCSI activity. Therefore, RESET_CNTB is not reset to its initial value, and control instead directly proceeds to step 1108.

If at step 1108 RESET_CNTB equals zero, this indicates that a series of resets has been received over the SCSI B bus 802 equalling the necessary value to cause the relays within the relay network 808 to switch. Therefore, control then proceeds from step 1108 to step 1114, where the relay network 808 is are switched to the standby server 104. This is accomplished by changing the outputs of P2.0–P2.3 to low values, which causes the relays of FIGS. 12A–13 to route the lines of the SCSI B bus 802 to the internal SCSI bus 812. This is preferably done sequentially with the P2.0–P2.3 outputs being switched one at a time to avoid voltage spikes.

If switching has not been implemented to allow the primary server 102 to resume control of the network 100 once it has been repaired without shutting down the standby server 104 and the storage device 106, control then proceeds to step 1116, where the reset monitoring stops. As will be appreciated, it is then necessary to power down the storage system 106 to restart the process of monitoring for resets on the SCSI B bus 802 and to allow the primary server 102 to again assume control of the network 100.

If switching has been implemented to allow the primary server 102 to dynamically resume control, control instead proceeds from step 114 to step 118, which entails a similar monitoring procedure for monitoring for resets on the SCSI A bus 800. At step 1118, a variable RESET_CNTA is set to #MAX_CNT, and then steps 1120, 1122, 1124, and 1126 are executed in a fashion corresponding to steps 1108, 1110, 1112, and 1114, with the exception that BSYAI# is monitored and RESET_CNTA is compared to zero. Step 1126 is executed once the decision at step 1120 determines that RESET_CNTA equals zero, indicating that a series of resets has been sent by the primary server 800 over the SCSI A bus 800. Then, the relays are switched to route the SCSI A bus 800 to the internal SCSI bus 812, and control loops to step 1102 to again start monitoring the SCSI B bus 802 for a series of resets.

Turning to FIG. 14B, the PCA procedure 1200 previously discussed is illustrated by a flowchart. The PCA procedure 1200 is entered whenever either RSTAI# or RSTBI# transitions low causing an interrupt. In this Figure, RST_A and RST_B are logical variables whose values are the inverse of the values of the RSTAI# and RSTBI# signals illustrated in FIG. 11. That is, these are the logical values rather than the physical state of those signals.

Proceeding from step 1200 to 1202, RST_B is first determined to be true or false by reading the P1.4 input of microcontroller 810. If it is true, this indicates a reset is being received over the SCSI B bus 802, so control proceeds to step 1204. At step 1204, RST_B is monitored for 15 microseconds to ensure that it remains high for that period of time. If it does not remain high for 15 microseconds, it is ignored as a spurious transition and control then proceeds to step 1206, where the interrupt procedure returns to the normally executed disk array routine 1100 of FIG. 14A. If at step 1204 RST_B remains high for 15 microseconds, control proceeds to step 1208 where RESET_CNTB is decremented, indicating that a reset pulse has been received. Control then proceeds from step 1208 to step 1206 and returns.

If at step 1202 RST_B is not true, control proceeds to step 1210, where RST_A is checked by reading input port P1.6. If it is true, steps corresponding to steps 1204 and 1208 are performed, illustrated by steps 1212 and 1214, where RESET_CNTA is correspondingly affected.

If RST_A is false at step 1210, other potential interrupt sources are monitored at step 1216, and then control proceeds to step 1206, where the interrupt routine is exited.

As will be appreciated, the routines of FIGS. 14A and 14B provide switching when a series of reset signals is provided over either the SCSI A bus 800 or the SCSI B bus 802. When a series of #MAX_CNT resets is received over the SCSI B bus 802, the relay network 808 switches from the SCSI A bus 800 to the SCSI B bus 802, permitting the standby server 104 to boot the NOS. If reverse switching is also implemented, corresponding resets over the SCSI A bus 800 cause the relay network 808 to switch back. In this way, the same bus that is used for communications with the storage system 106 is also used to instruct the storage system 106 to switch between the appropriate SCSI bus. This eliminates extra cabling through the use of in-band signaling.

Other signals could also be used on the SCSI A bus 800 or SCSI B bus 802. For example, instead of monitoring for a series of resets, the microcontroller 810 could be coupled to the TERMPWRAI and TERMPWRBI signals, which should have voltage on them during normal operation. The primary server 102 and the standby server 104 could then be configured to lower those two corresponding signals when the system failed, such as by using ASR to cycle power on these signals. In such a system, a switch would occur from the SCSI A bus 800 to the SCSI B bus 802 when the SCSI A bus 800 no longer had power on its TERMPWRA line. A corresponding switch could be made back to the SCSI A bus 800 when the TERMPWRB line no longer had power. A number of other lines on the SCSI bus could similarly be used. This will all be appreciated by one of ordinary skill in the art.

By the term "in-band", it will be appreciated that this term refers to the use of an otherwise necessary communications link to provide the "switch the relays" message rather than providing that message over a secondary communications link.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A method of operating a computing device in a standby mode, the method comprising the steps of:

monitoring an input node of the computing device for a determination that the computing device must be transferred from the standby mode to an active mode;

upon determining that the computing device must be transferred from the standby mode to an active mode, sending an indication to a storage system to cause the storage system to switch from communicating with a second computing device as a primary device to communicating with the computing device as the primary device, the indication being sent along a first signal line;

receiving a boot program from the storage system along the first signal line; and booting the computing device in the active mode.

2. The method of claim 1 wherein the computing device is a server.

3. The method of claim 1 wherein the monitoring step comprises monitoring the input node for periodic signals and upon failing to receive the period signals determining that the computing device must be transferred from the standby mode to an active mode.

4. The method of claim 1 wherein the computing device is coupled to a port of the storage unit, wherein the port includes signal lines for carrying signals according to a bus standard and wherein the first signal line comprises at least one signal line of the port.

5. The method of claim 4 wherein the port comprises a SCSI port.

6. The method of claim 1 wherein the step of sending an indication to a storage unit comprises sending a series of reset pulses.

7. The method of claim 6 wherein the series of reset pulses comprises eight sequential resets.

8. The method of claim 6 wherein the series of reset pulses are each of a predetermined length of time and are uninterrupted by any intervening busy pulses.

9. The method of claim 1 wherein the step of sending an indication to a storage unit comprises changing a voltage level on a terminator power line.

10. A computer-implemented process to control a server in a primary or standby mode, the process comprising the steps of:

(1) determining whether the server is configured in a primary mode;
(2) if the server is configured in a primary mode, performing the steps of:
   (a) determining the presence of a storage medium;
   (b) loading an operating system from a storage medium through a first port; and
   (c) booting the operating system;
(3) if the server is not configured in a primary mode, performing the steps of:
   (a) initializing a timer;
   (b) monitoring an input node to determine the receipt of a heartbeat signal;
   (c) resetting the timer if the heartbeat signal is received;
   (d) initiating a switch command if the heartbeat signal is not received within a predetermined amount of time, the step of initiating a switch command including outputting a signal to the first port to cause the storage medium to switch the coupling of the storage medium from a failed server to the server;
   (e) loading the operating system from the storage medium through the first port; and
   (f) booting the operating system.

11. The process of claim 10 and further comprising the step of determining whether the server is configured for standby operation before determining whether the server is configured in a primary mode.

12. The process of claim 10 and, if the server is configured in the primary mode, performing the further steps of determining if the server is restarting from a non-graceful shutdown and if so indicating a desire to run a diagnostic program.

13. The process of claim 10 and, if the server is not configured in the primary mode, determining whether there is a cable fault at the input node prior to monitoring the input node.

14. The process of claim 10 and, if the server is not configured in the primary mode, further comprising the step of initiating the switch command upon receipt of a user input indicating that the user wishes to switch the server mode.

15. The process of claim 10 wherein the first port comprises a SCSI port.

16. The process of claim 10 wherein the step of outputting a signal to the first port comprises outputting a series of reset pulses.

17. The process of claim 16 wherein the series of reset pulses comprises eight sequential resets.

18. The process of claim 16 wherein the series of reset pulses are each of a predetermined length of time and are uninterrupted by any intervening busy pulses.

19. The method of claim 10 wherein the step of outputting a signal to the first port comprises changing a voltage level on a terminator power line.

20. A computer system comprising:
a microprocessor;
a memory array;
a bus coupling the microprocessor to the memory array;
a non-volatile memory device for storing a computer program which can be run by the computer system, the computer program encompassing a process to control the computer system in a primary or standby mode, the process comprising the steps of:
   (1) determining whether the computer system is configured in a primary mode;
   (2) if the computer system is configured in a primary mode, performing the steps of:
      (a) determining the presence of a storage medium;
      (b) loading an operating system from a storage medium through a first port; and
      (c) booting the operating system;
   (3) if the computer system is not configured in a primary mode, performing the steps of:
      (a) initializing a timer;
      (b) monitoring an input node to determine the receipt of a heartbeat signal;
      (c) resetting the timer if the heartbeat signal is received;
      (d) initiating a switch command if the heartbeat signal is not received within a predetermined amount of time, the step of initiating a switch command including outputting a signal to the first port to cause the storage medium to switch the coupling of the storage medium from a failed computer system to the computer system;
      (e) loading the operating system from the storage medium through the first port; and
      (f) booting the operating system.

21. The system of claim 20 wherein the non-volatile memory device comprises a read only memory.

22. The system of claim 21 wherein the non-volatile memory device comprises a flash EEPROM.

23. The system of claim 20 wherein the non-volatile memory device comprises a local boot drive or disk.

24. The system of claim 20 wherein the computer system comprises a server.

25. The system of claim 20 wherein the first port comprises a SCSI port.

* * * * *